(12) United States Patent
Shinohara

(10) Patent No.: US 12,504,608 B2
(45) Date of Patent: Dec. 23, 2025

(54) ZOOM LENS, IMAGE PICKUP APPARATUS HAVING THE SAME, AND IMAGING SYSTEM

(71) Applicant: CANON KABUSHIKI KAISHA, Tokyo (JP)

(72) Inventor: Kenji Shinohara, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 395 days.

(21) Appl. No.: 18/333,579

(22) Filed: Jun. 13, 2023

(65) Prior Publication Data
US 2023/0408799 A1 Dec. 21, 2023

(30) Foreign Application Priority Data
Jun. 15, 2022 (JP) .................... 2022-096261

(51) Int. Cl.
*G02B 15/14* (2006.01)
*G02B 13/00* (2006.01)
*G02B 13/02* (2006.01)

(52) U.S. Cl.
CPC ....... *G02B 15/1425* (2019.08); *G02B 13/009* (2013.01); *G02B 13/02* (2013.01)

(58) Field of Classification Search
CPC ... G02B 9/04; G02B 9/06; G02B 9/10; G02B 15/142; G02B 15/1425
See application file for complete search history.

(56) References Cited

U.S. PATENT DOCUMENTS

| 7,277,233 | B2 * | 10/2007 | Satori | G02B 15/143507 |
| | | | | 359/689 |
| 9,146,387 | B2 | 9/2015 | Shinohara | |
| 11,703,661 | B2 | 7/2023 | Tsuneta et al. | |
| 2009/0201592 | A1 * | 8/2009 | Yamada | G02B 7/08 |
| | | | | 359/692 |

FOREIGN PATENT DOCUMENTS

| JP | H10-133110 A | 5/1998 |
| JP | 2013-178300 A | 9/2013 |

* cited by examiner

*Primary Examiner* — Joseph P Martinez
(74) *Attorney, Agent, or Firm* — Carter, DeLuca & Farrell LLP

(57) ABSTRACT

A zoom lens includes, in order from an object side to an image side, a first lens unit having negative refractive power and a second lens unit having positive refractive power. A distance between adjacent lens units changes during zooming. The first lens unit includes a plurality of lenses, the plurality of lenses consisting of a negative lens having a concave lens surface on the image side, and a positive lens having a convex lens surface on the object side and disposed on the image side of the negative lens via an air gap. A predetermined condition is satisfied.

19 Claims, 11 Drawing Sheets

ZOOM LENS, IMAGE PICKUP APPARATUS HAVING THE SAME, AND IMAGING SYSTEM

BACKGROUND

Technical Field

One of the aspects of the disclosure relates to a zoom lens, and more particularly to a zoom lens that is suitable for an image pickup apparatus, such as a digital video camera, a digital still camera, a broadcasting camera, a film-based camera, a surveillance camera, and the like.

Description of Related Art

Some conventional zoom lenses include, in order from the object side to the image side, a first lens unit having negative refractive power and a second lens unit having positive refractive power, and a focal length in a standard range (Japanese Patent Laid-Open Nos. 2013-178300 and 10-133110).

The zoom lens disclosed in Japanese Patent Laid-Open No. 2013-178300 is large as a whole and cannot achieve sufficient image quality. The zoom lens disclosed in Japanese Patent Laid-Open No. 10-133110 cannot sufficiently correct various aberrations such as spherical aberration and coma.

SUMMARY

One of the aspects of the present disclosure provides a zoom lens having excellent optical performance over the entire zoom range.

A zoom lens according to one aspect of the disclosure includes, in order from an object side to an image side, a first lens unit having negative refractive power and a second lens unit having positive refractive power. A distance between adjacent lens units changes during zooming. The first lens unit includes a plurality of lenses, the plurality of lenses consisting of a negative lens having a concave lens surface on the image side, and a positive lens having a convex lens surface on the object side and disposed on the image side of the negative lens via an air gap. The following inequalities are satisfied:

$$-7.00 < f12/f11 < -30.70$$

$$0.40 (R1f + R2r)/(R1f - R2r) < 1.00$$

where f11 is a focal length of the negative lens, f12 is a focal length of the positive lens, R1f is a radius of curvature of a lens surface on the object side of the negative lens, and R2r is a radius of curvature of a lens surface on the image side of the positive lens. An image pickup apparatus and an imaging system each including the above zoom lens also constitute another aspect of the disclosure.

Further features of the disclosure will become apparent from the following description of embodiments with reference to the attached drawings.

DESCRIPTION OF THE EMBODIMENTS

Figure 1:
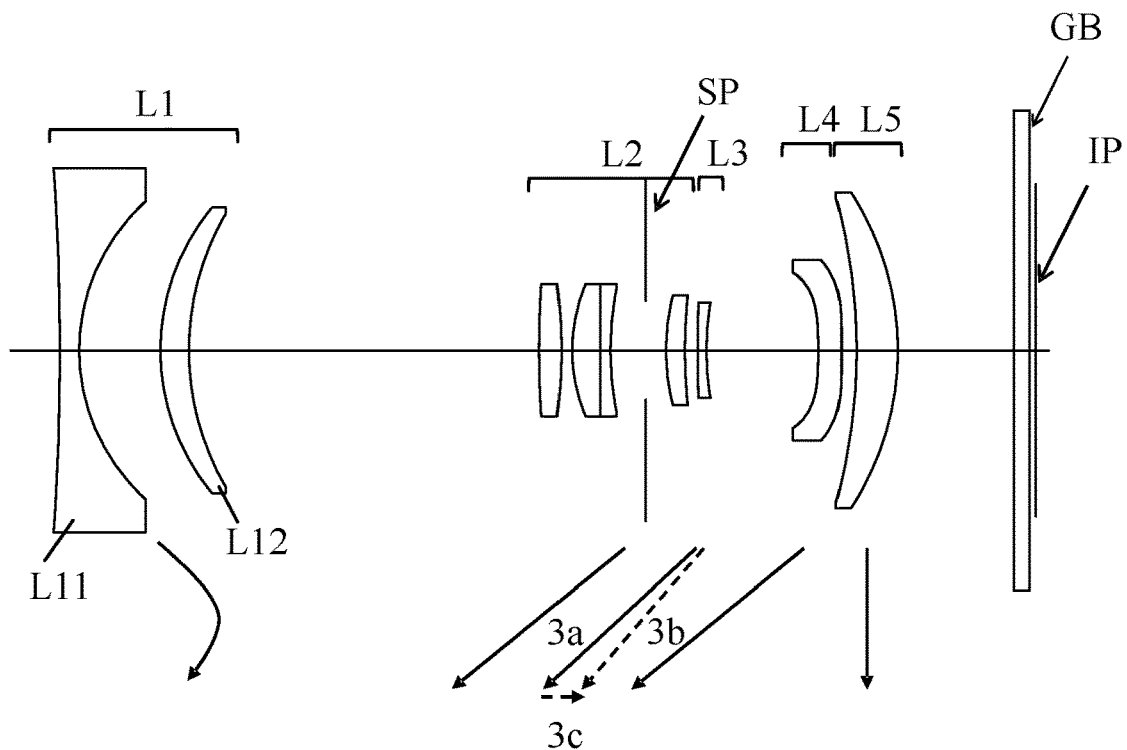
FIG. 1 is a sectional view of a zoom lens according to Example 1 at a wide-angle end.
Figure 2A:
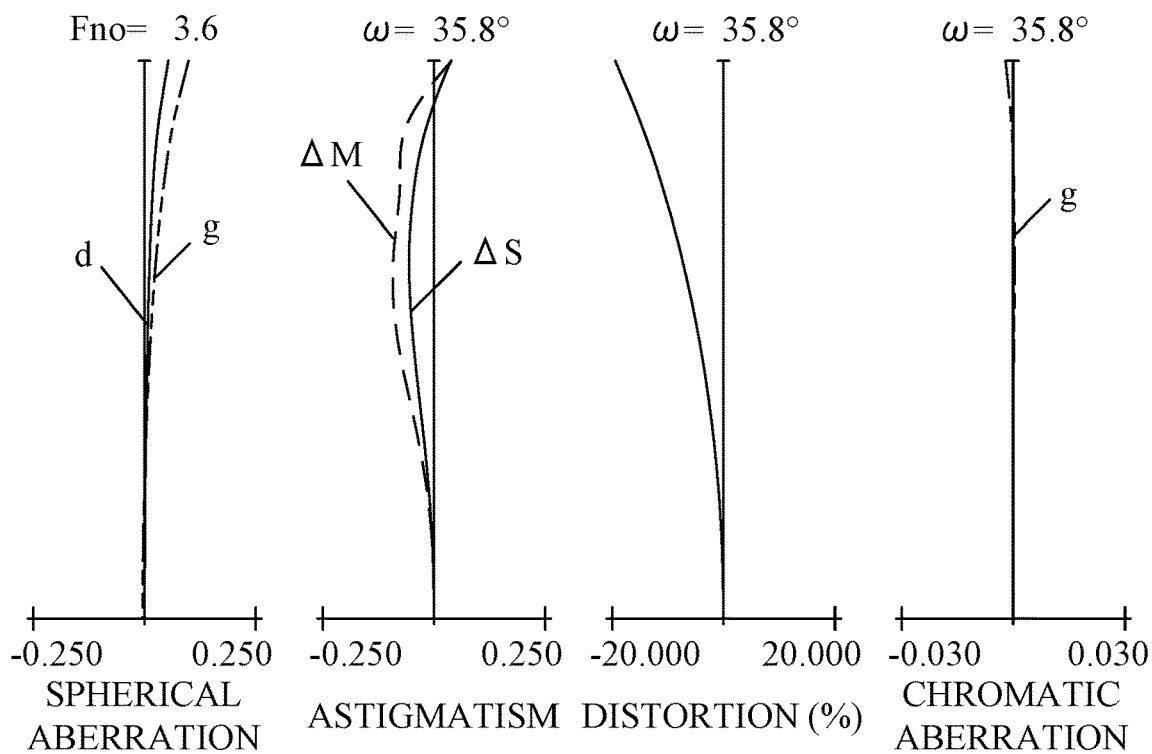
FIGS. 2A to 2C are aberration diagrams of the zoom lens according to Example 1 at the wide-angle end, an intermediate (middle) position, and a telephoto end, respectively.
Figure 2B:
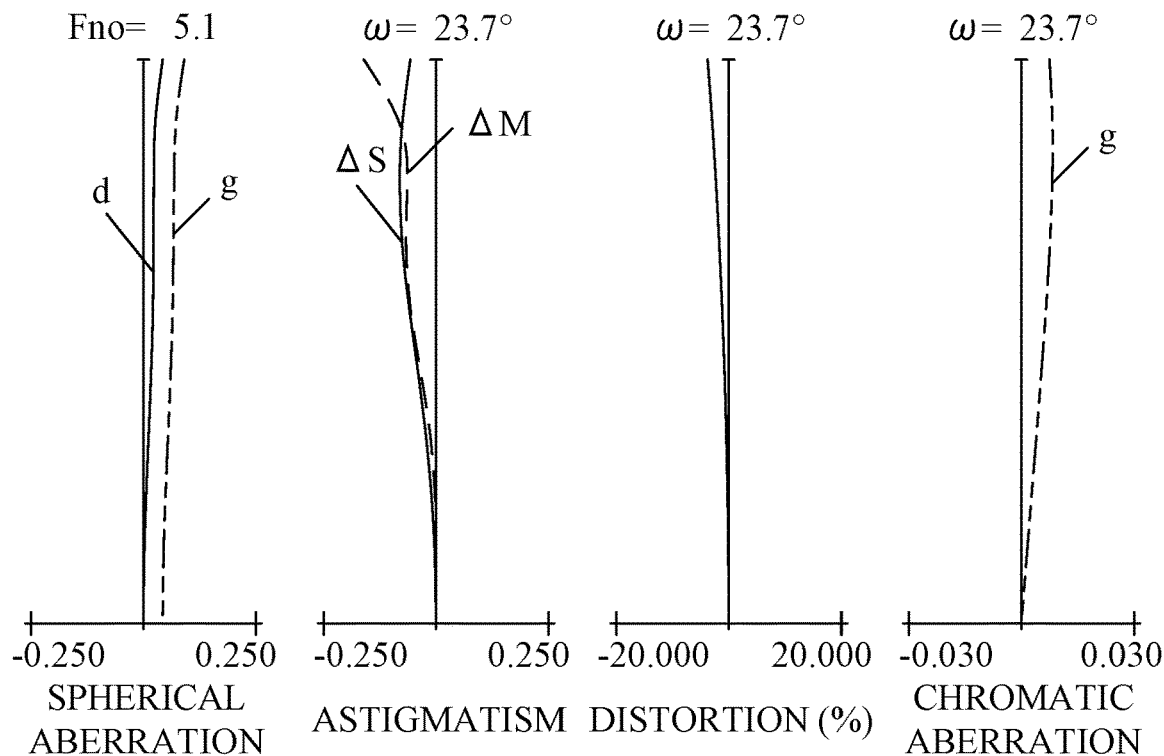
Figure 2C:
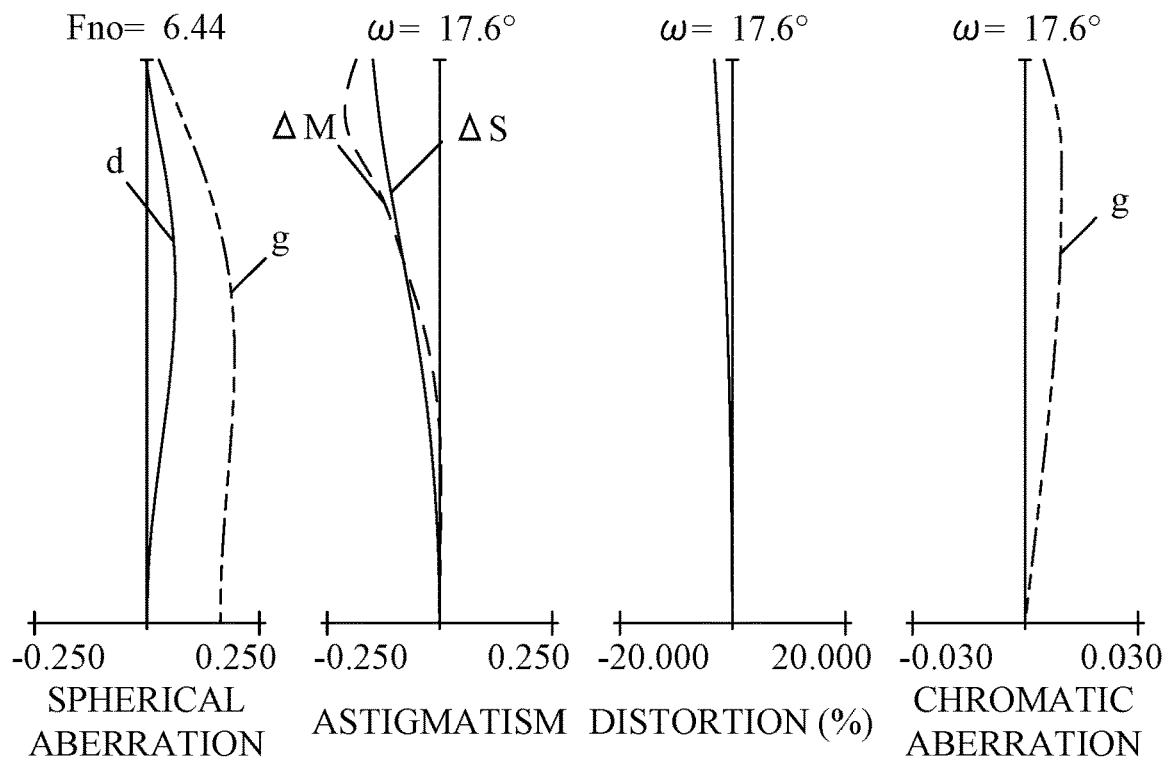
Figure 3:
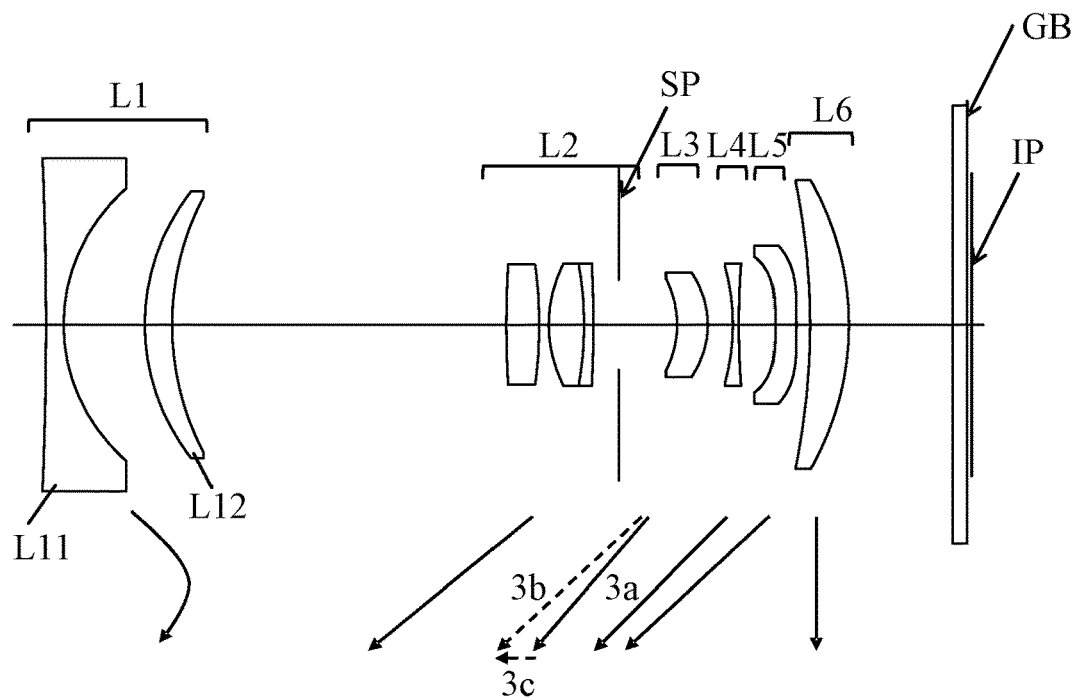
FIG. 3 is a sectional view of a zoom lens according to Example 2 at a wide-angle end.
Figure 4A:
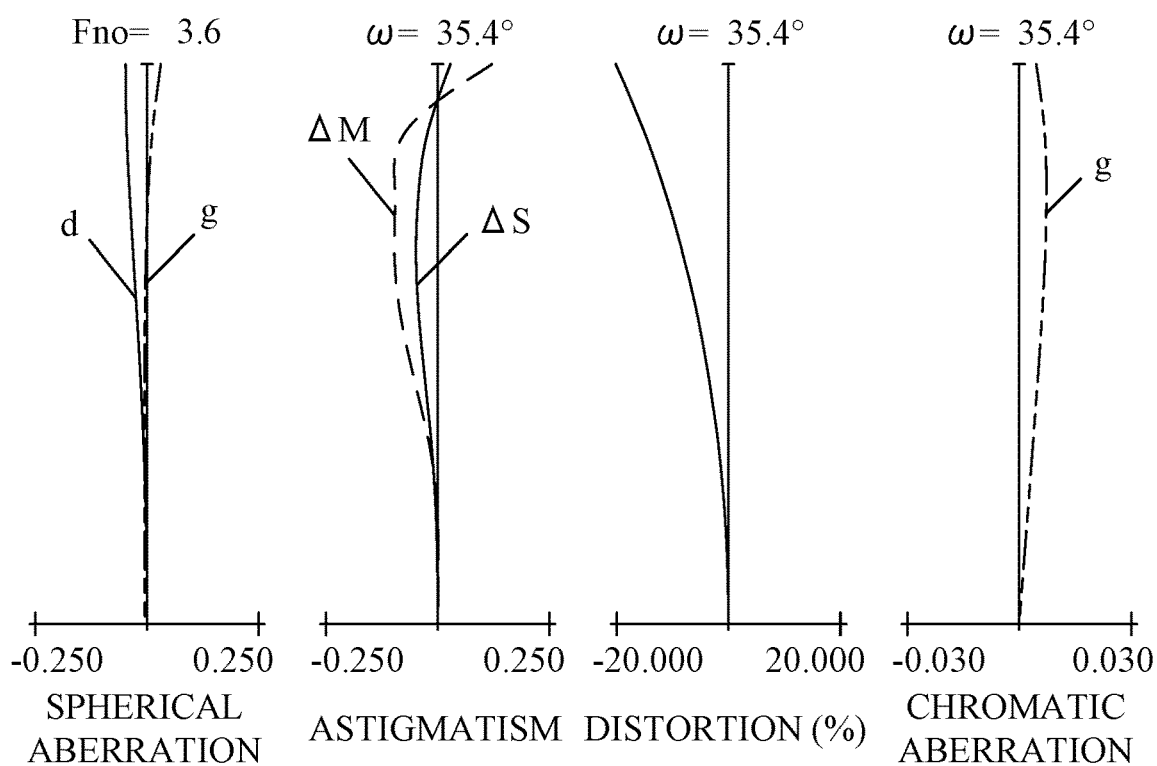
FIGS. 4A to 4C are aberration diagrams of the zoom lens according to Example 2 at the wide-angle end, an intermediate (middle) position, and a telephoto end.
Figure 4B:
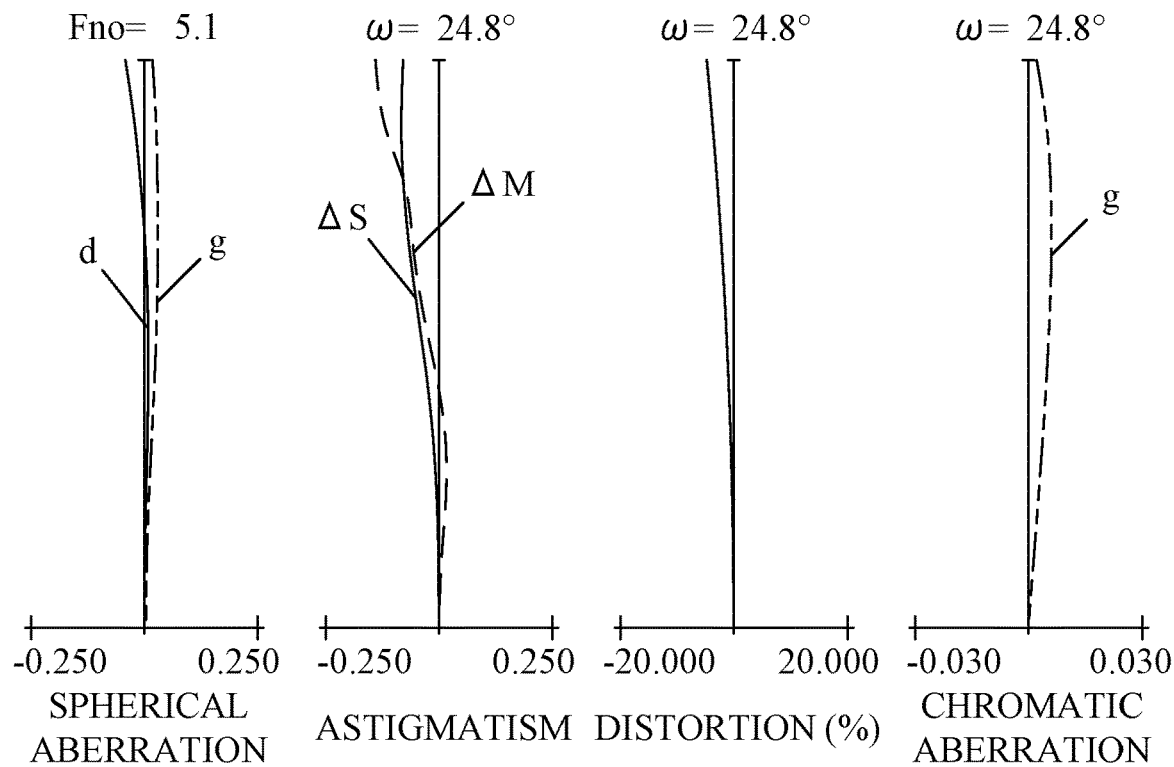
Figure 4C:
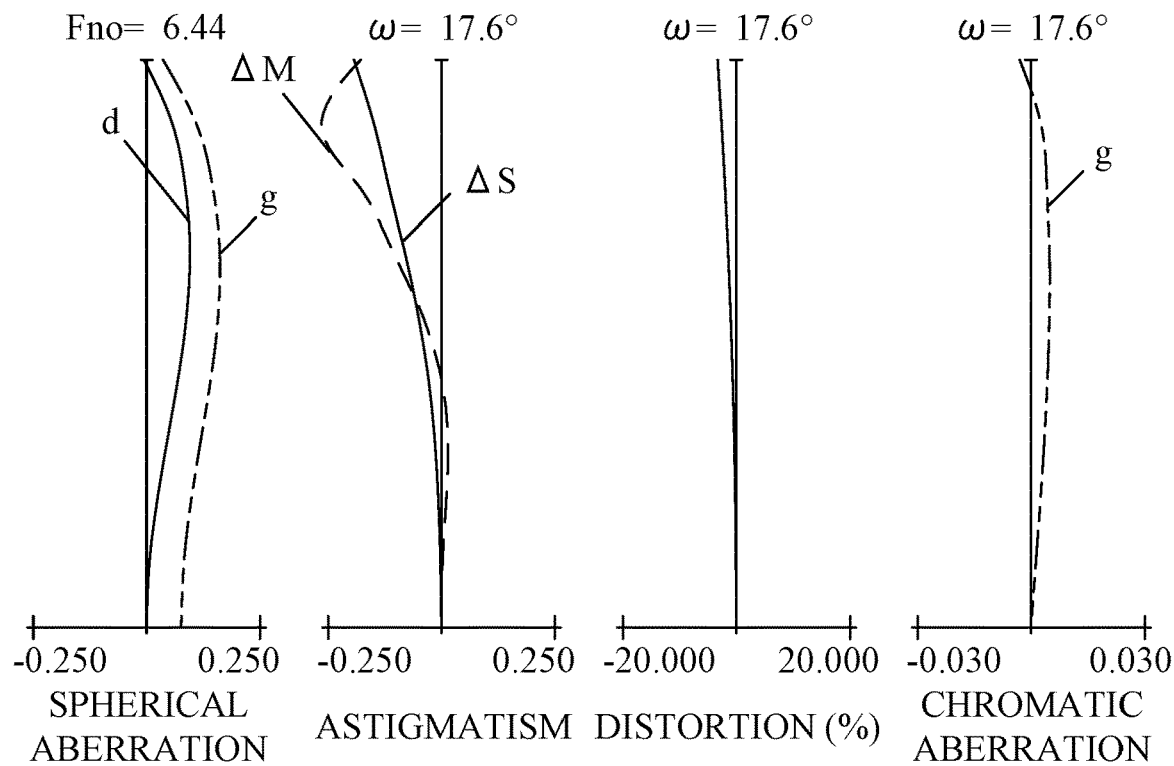
Figure 5:
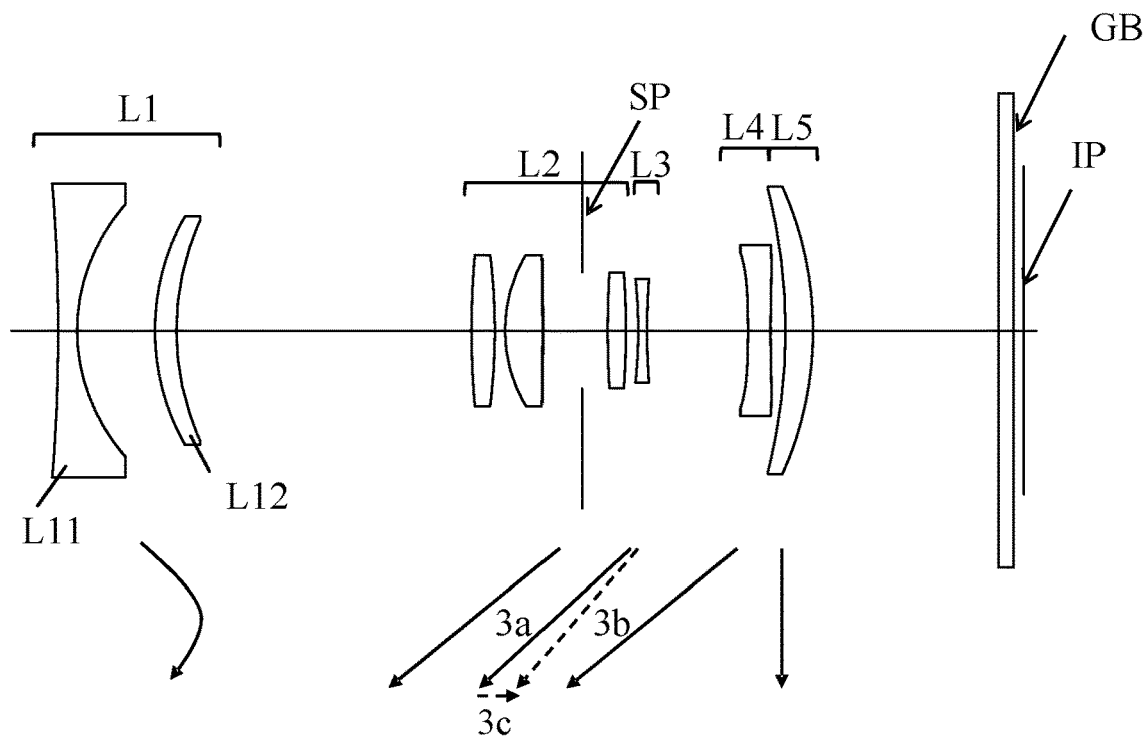
FIG. 5 is a sectional view of a zoom lens according to Example 3 at a wide-angle end.
Figure 6A:
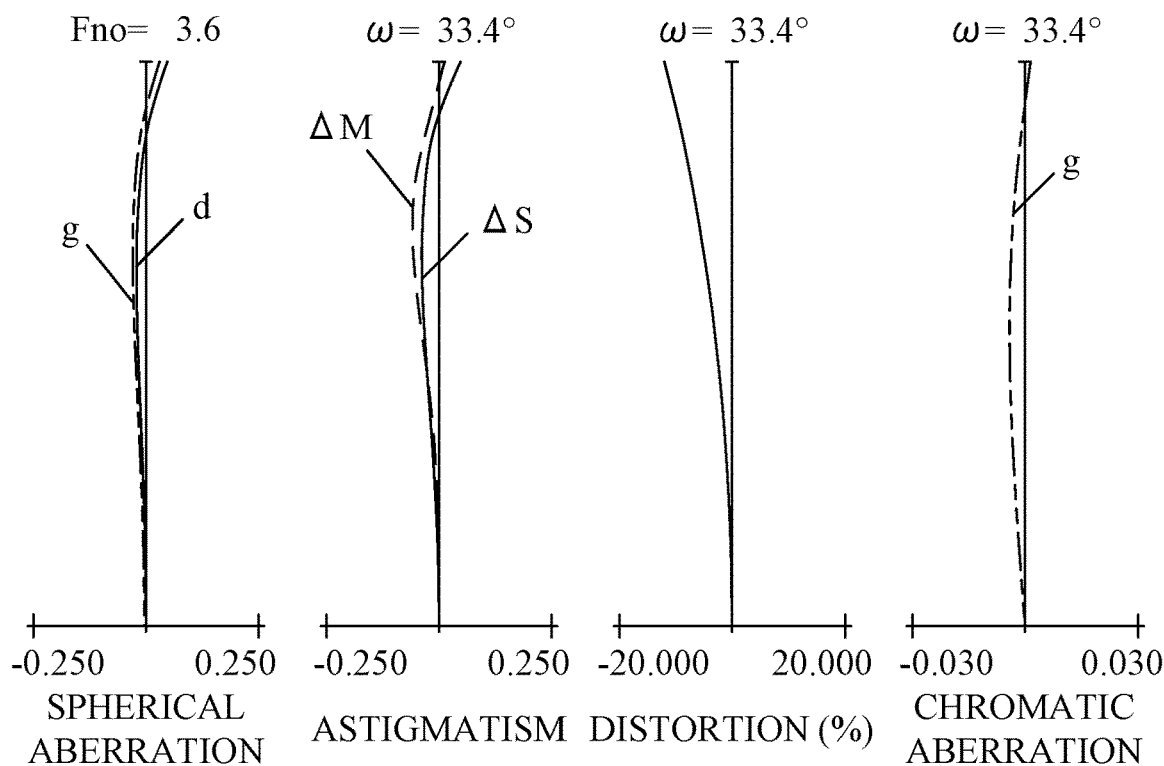
FIGS. 6A to 6C are aberration diagrams of the zoom lens according to Example 3 at the wide-angle end, an intermediate (middle) position, and a telephoto end.
Figure 6B:
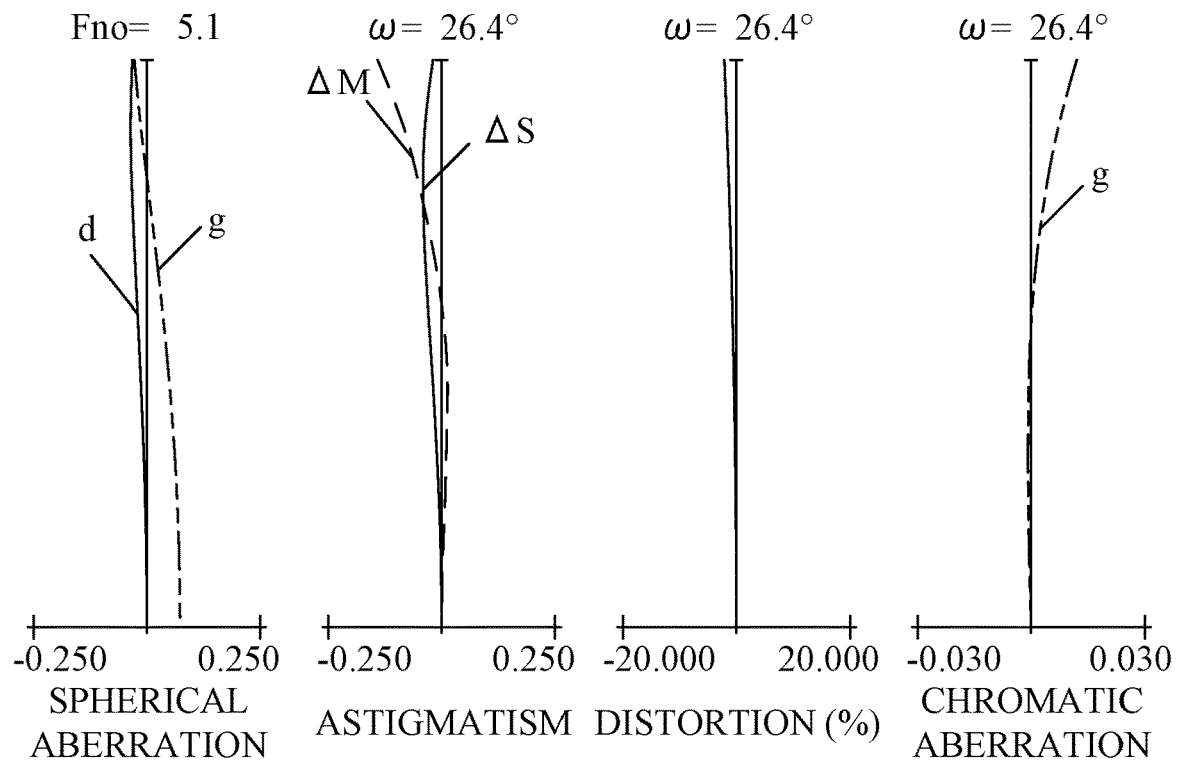
Figure 6C:
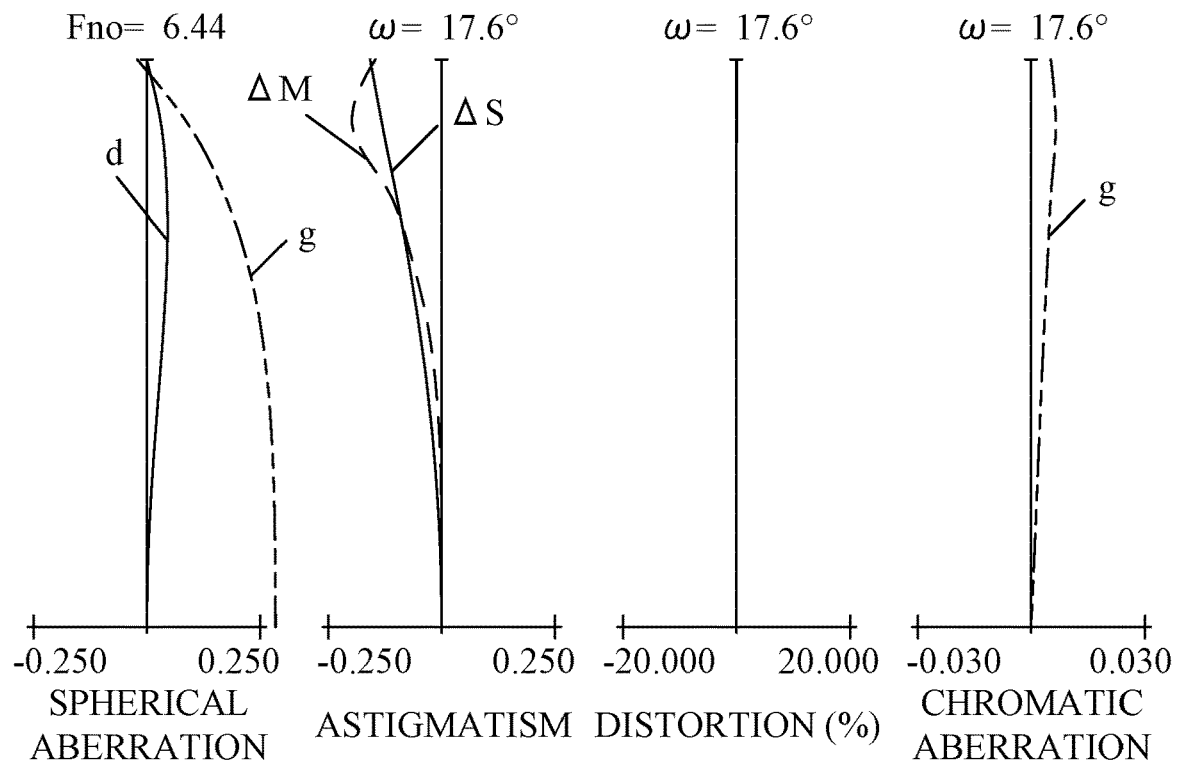
Figure 7:
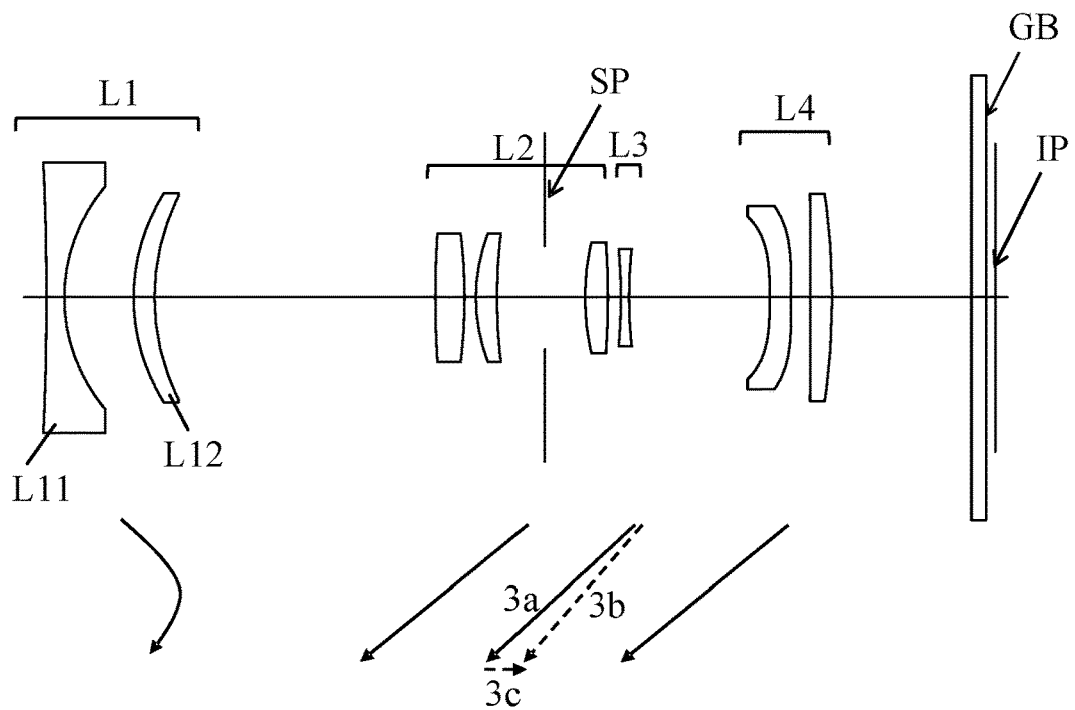
FIG. 7 is a sectional view of a zoom lens according to Example 4 at a wide-angle end.
Figure 8A:
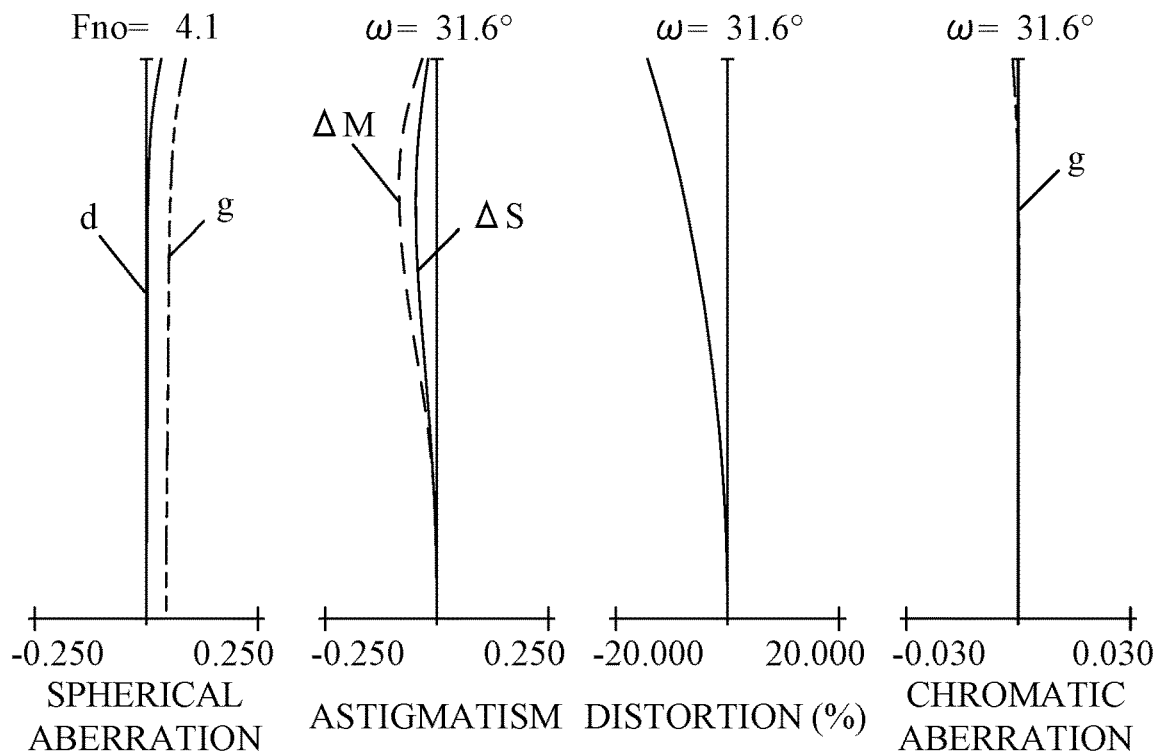
FIGS. 8A to 8C are aberration diagrams of the zoom lens according to Example 4 at the wide-angle end, an intermediate (middle) position, and a telephoto end.
Figure 8B:
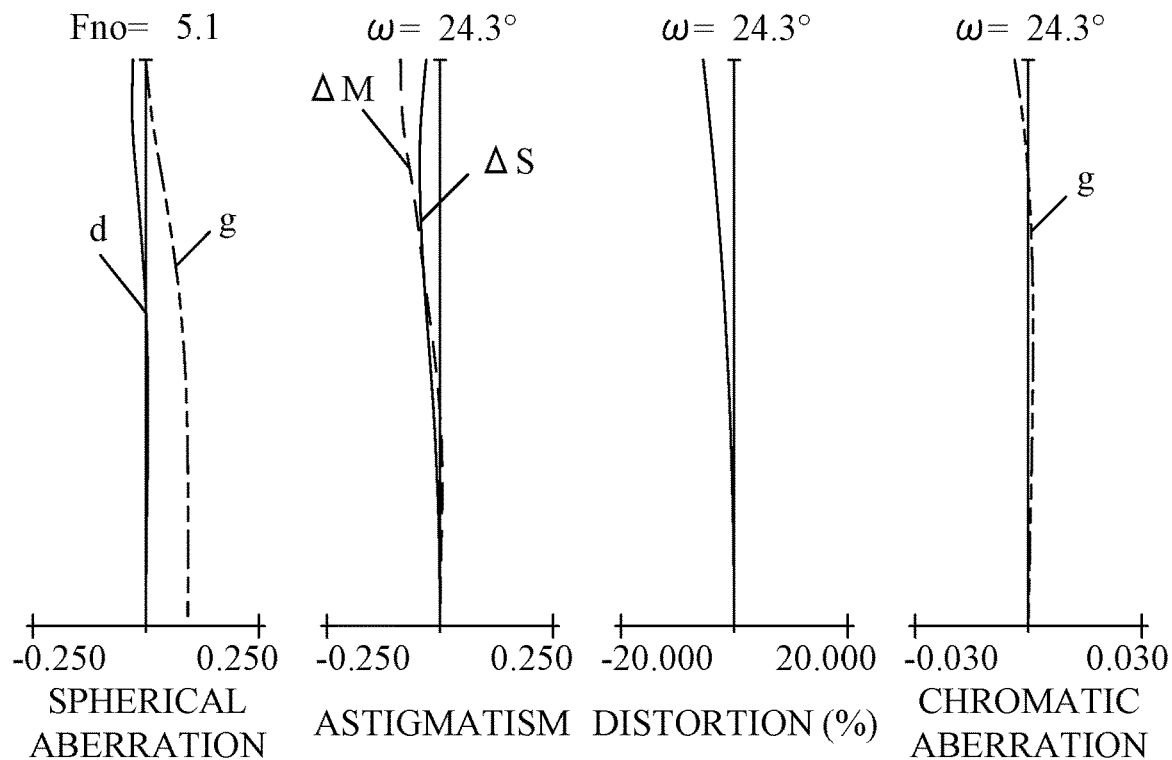
Figure 8C:
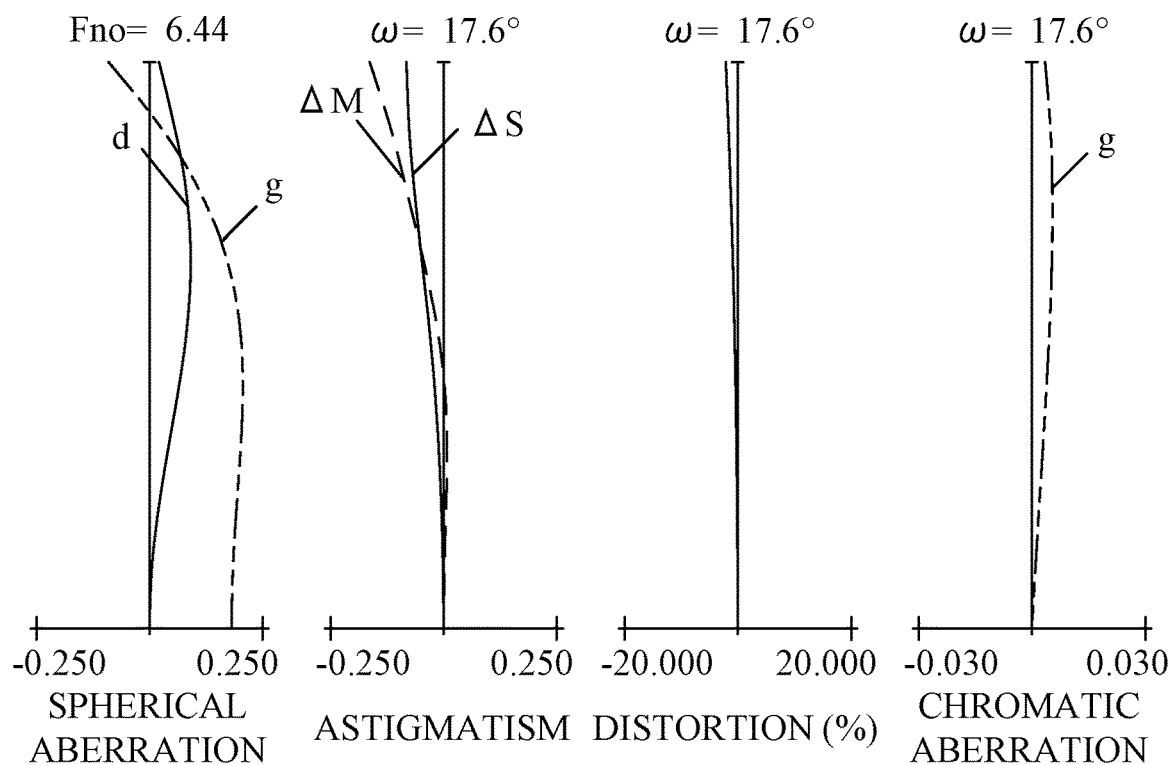
Figure 9:
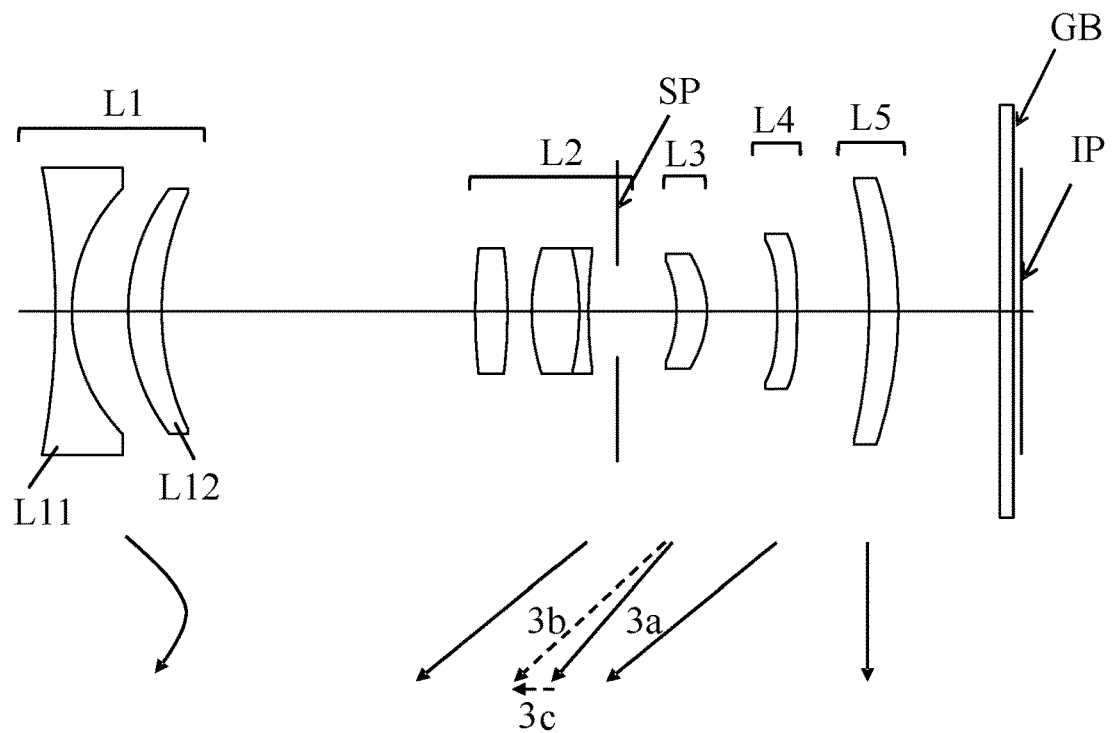
FIG. 9 is a sectional view of a zoom lens according to Example 5 at a wide-angle end.
Figure 10A:
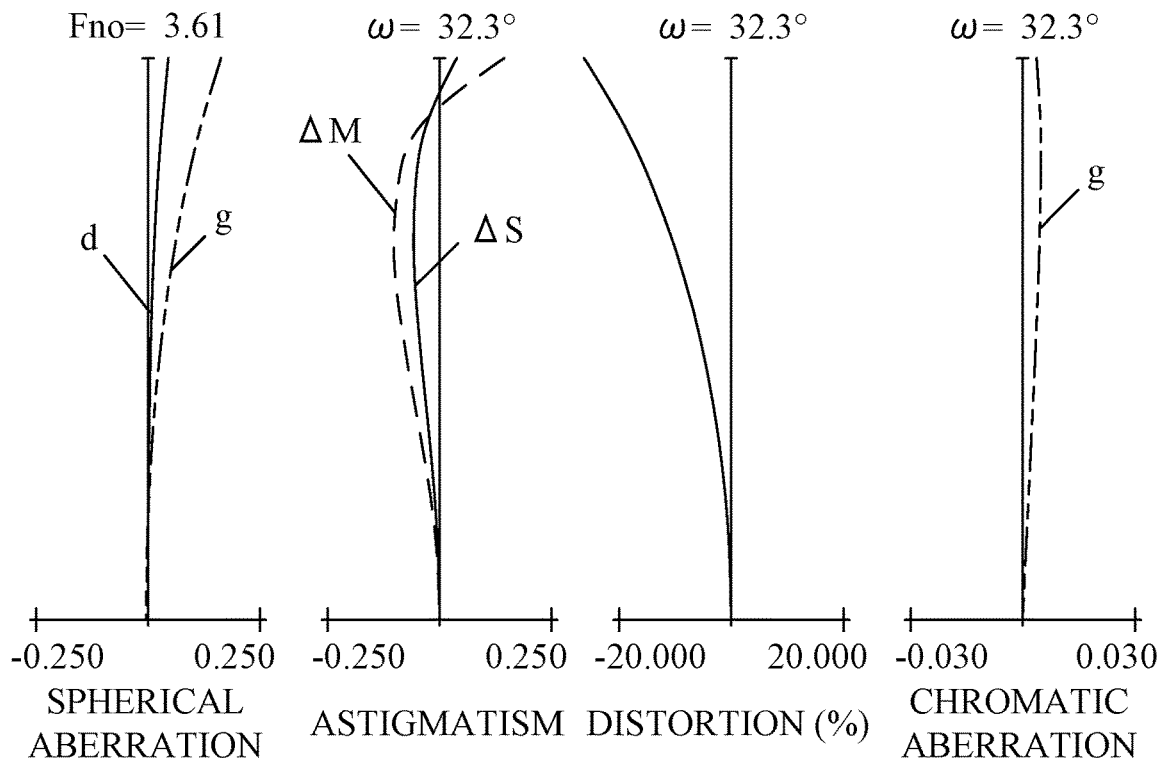
FIGS. 10A to 10C are aberration diagrams of the zoom lens according to Example 5 at the wide-angle end, an intermediate (middle) position, and a telephoto end.
Figure 10B:
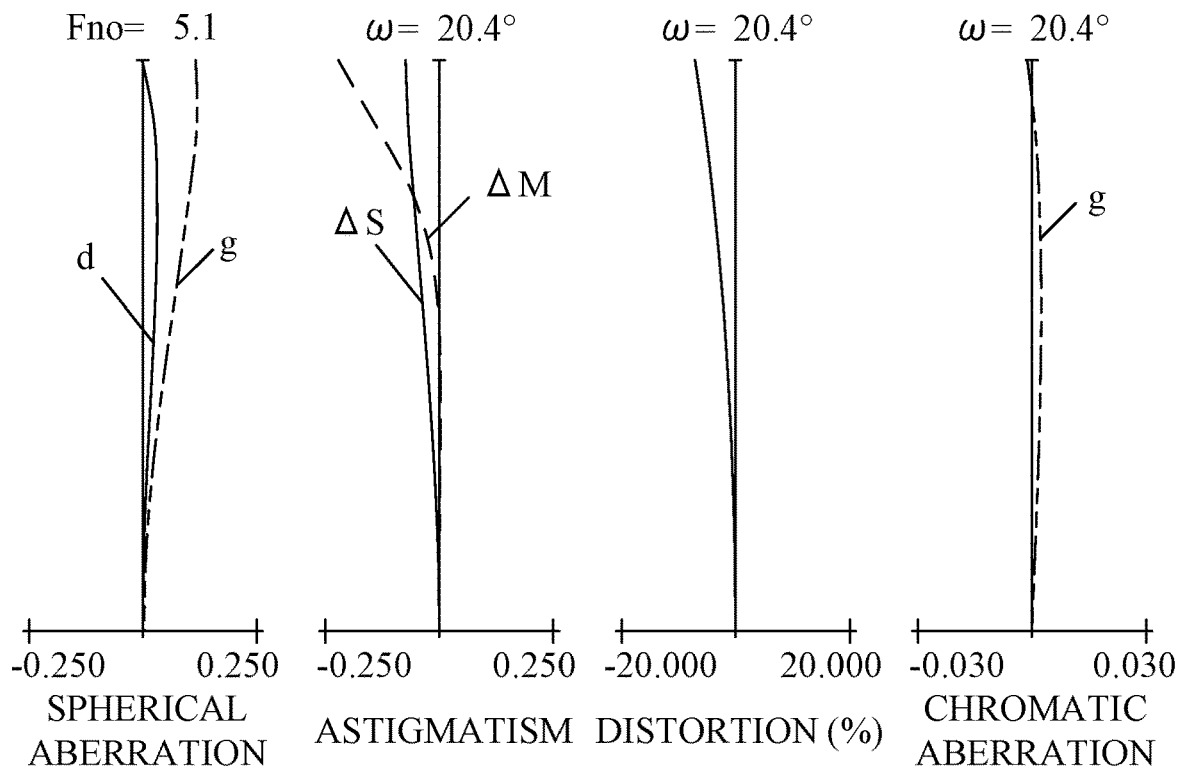
Figure 10C:
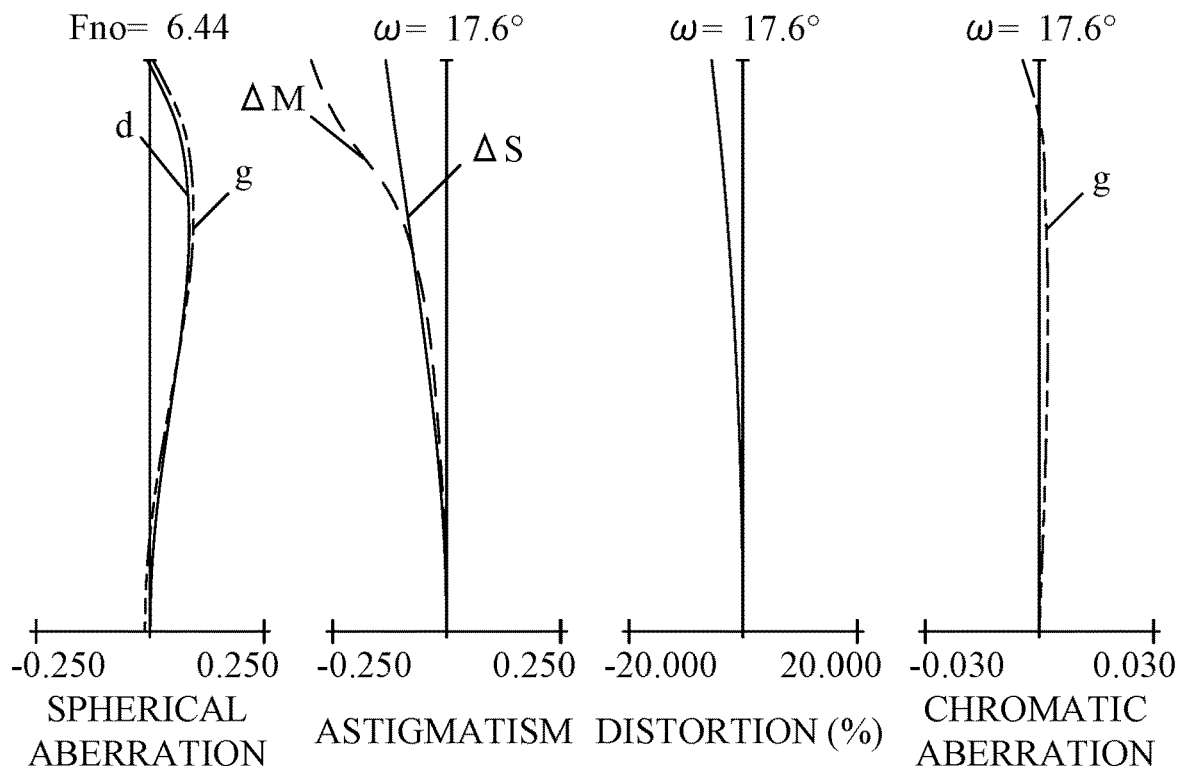

Referring now to the accompanying drawings, a detailed description will be given of examples according to the disclosure. Corresponding elements in respective figures will be designated by the same reference numerals, and a duplicate description thereof will be omitted.

FIGS. 1, 3, 5, 7, and 9 are sectional views of zoom lenses according to Examples 1 to 5 at the wide-angle end, respectively. The zoom lens according to each example is used in an optical apparatus including an interchangeable lens for an image pickup apparatus such as a digital video camera, a digital still camera, a broadcasting camera, a film-based camera, and a surveillance camera.

In this example, the wide-angle end and the telephoto end are both end positions of a movable range on the optical axis of the magnification varying lens unit.

In each sectional view, a left side is an object side, and a right side is an image side. The zoom lens according to each example includes a plurality of lens units. In the specification of the present application, a lens unit is a group of lenses that move or stand still during zooming. That is, in the zoom lens according to each example, a distance between adjacent lens units changes during zooming. An arrow illustrated in each sectional view indicates a moving direction of the lens unit during zooming. The lens unit may include one or more lenses. The lens unit may include an aperture stop.

The zoom lens according to each example includes, in order from the object side to the image side, a first lens unit L1 having negative refractive power and a second lens unit L2 having positive refractive power. The zoom lens according to each example is a standard range lens, and is to cover from a wide angle to standard. Thus, it adopts a negative lead configuration in which the first lens unit is a negative unit. The zoom lens according to each example adopts a power arrangement suitable for short back.

In each sectional view, L1 represents an i-th (i is a natural number) lens unit counted from the object side among lens units included in the zoom lens.

SP denotes an aperture stop (diaphragm), and GB denotes a glass block. IP denotes an image plane. In a case where the zoom lens according to each example is used as an imaging optical system of a digital still camera or a digital video camera, the imaging plane of a solid-state image sensor (photoelectric conversion element) such as a CCD sensor or a CMOS sensor is placed on the image plane IP. In a case where the zoom lens according to each example is used as an imaging optical system of a film-based camera, a photosensitive plane corresponding to the film plane is placed on the image plane IP.

FIGS. 2A, 4A, 6A, 8A, and 10A are aberration diagrams of the zoom lenses according to Examples 1 to 5 at the wide-angle end, respectively. FIGS. 2B, 4B, 6B, 8B, and 10B are aberration diagrams of the zoom lenses according to Examples 1 to at an intermediate (middle) position, respectively. FIGS. 2C, 4C, 6C, 8C, and 10C are aberration diagrams of the zoom lenses according to Examples 1 to 5 at the telephoto end, respectively.

In the spherical aberration diagram, Fno denotes an F-number. The spherical aberration diagram indicates spherical aberration amounts for the d-line (wavelength 587.6 nm) and g-line (wavelength 435.8 nm). In the astigmatism diagram, $\Delta S$ indicates an astigmatism amount on a sagittal image plane, and $\Delta M$ indicates an astigmatism amount on a meridional image plane. The distortion diagram illustrates a distortion amount for the d-line. The chromatic aberration diagram illustrates a chromatic aberration amount for the g-line. $\omega$ is an imaging half angle of view (degrees).

A description will now be given of the characteristic configuration of the zoom lens according to each example.

The first lens unit L1 consists of a negative lens L11 having a concave lens surface on the image side, and a positive lens L12 having a convex lens surface on the object side and disposed on the image side of the negative lens L11 via an air gap. The first lens unit L1 including two lenses can reduce the number of lens surfaces that cause ghosts. The lens surface on the image side of the negative lens L11 is concave, and the lens surface on the object side of the positive lens L12 is convex, thereby enhancing the power arrangement of the negative lens L11. Thereby, distortion is permitted and various aberrations including curvature of field can be satisfactorily corrected.

The zoom lens according to each example satisfies the following inequalities (1) and (2):

$$-7.00 < f12/f11 < -3.70 \tag{1}$$

$$0.40 < (R1f+R2r)/(R1f-R2r) < 1.00 \tag{2}$$

where f11 is a focal length of the negative lens L11. f12 is a focal length of the positive lens L12. R1f is a radius of curvature of a lens surface on the object side of the negative lens L11. R2r is a radius of curvature of a lens surface on the image side of the positive lens L12.

Inequality (1) defines the power arrangement of the negative lens L11 and the positive lens L12 of the first lens unit L1. In a case where the value f12/f11 is lower than the lower limit of inequality (1), the refractive power of the positive lens L12 becomes weaker, and it becomes difficult to correct longitudinal chromatic aberration and lateral chromatic aberration in the first lens unit L1. The distortion generated in the first lens unit L1 becomes large and difficult to correct. In a case where the value f12/f11 is higher than the upper limit of inequality (1), the refractive power of the negative lens L11 becomes weaker, which is beneficial to field curvature correction, but it becomes difficult to secure the angle of view at the wide-angle end.

Inequality (2) defines a shape determined by the radii of curvature of the lens surface closest to the object of the first lens unit L1 (the lens surface on the object side of the negative lens L11) and the lens surface closest to the image plane of the first lens unit L1 (the lens surface on the image side of the positive lens L12). In a case where the value (R1f+R2r)/(R1f−R2r) is lower than the lower limit of inequality (2), the curvature of the lens surface closest to the object of the first lens unit L1 becomes more concave toward the object side, and it becomes to correct distortion and curvature of field. In a case where the value (R1f+R2r)/(R1f−R2r) is higher than the upper limit of inequality (2), the curvature of the lens surface closest to the image plane of the first lens unit L1 becomes more concave on the image side, and it becomes difficult to correct coma.

The above configuration can realize a zoom lens having excellent optical performance over the entire zoom range.

Inequalities (1) and (2) may be replaced with inequalities (1a) and (2a):

$$-6.80 < f12/f11 < -3.70 \tag{1a}$$

$$0.42 < (R1f+R2r)/(R1f-R2r) < 0.95 \tag{2a}$$

Inequalities (1) and (2) may be replaced with inequalities (1b) and (2b):

$$-6.50 < f12/f11 < -3.75 \tag{1b}$$

$$0.45 < (R1f+R2r)/(R1f-R2r) < 0.90 \tag{2b}$$

A description will now be given of conditions that the zoom lens according to each example may satisfy. The zoom lens according to each example may satisfy one or more of the following inequalities (3) to (8):

$$1.60 < Ndave < 1.81 \tag{3}$$

$$-2.0 < f1/f2 < -1.0 \tag{4}$$

$$0.05 < D1/TL < 0.30 \tag{5}$$

$$25.0 < vd1n - vd1p < 40.0 \tag{6}$$

$$-0.55 < f1/fimg < -0.05 \tag{7}$$

$$-25.0 < (R1r+R2f)/(R1r-R2f) < -5.0 \tag{8}$$

Here, Ndave is an average refractive index of the negative lens L11 and the positive lens L12. f1 is a focal length of the first lens unit L1. f2 is a focal length of the second lens unit L2. D1 is a distance on the optical axis from the lens surface on the object side of the negative lens L11 to the lens surface on the image side of the positive lens L12. TL is a distance (overall optical length) on the optical axis from the lens surface on the object side of the negative lens L11 to the image plane at the wide-angle end. vd1n is an Abbe number of the negative lens L11. vd1p is an Abbe number of the positive lens L12. fimg is a focal length of the lens unit closest to the image plane of the subsequent group including one or more lens units and disposed on the image side of the second lens unit L2. R1r is a radius of curvature of the lens surface on the image side of the negative lens L11. R2f is a radius of curvature of the lens surface on the object side of the positive lens L12.

Inequality (3) defines the glass material of the lenses in the first lens unit L1. In a case where the value Ndave is lower than the lower limit of inequality (3), the refractive index of the lenses in the first lens unit L1 becomes low, the curvature of each lens increases, and it becomes difficult to correct various aberrations such as curvature of field. In a case where the value Ndave is higher than the upper limit of inequality (3), the refractive index of the lenses in the first lens unit L1 increases, the curvature of each lens becomes weaker, which is beneficial to correction of various aberrations, but the transmittance on the short wavelength side deteriorates and color reproducibility of the lens deteriorates due to biased color balance.

Inequality (4) defines the power arrangement of the first lens unit L1 and the second lens unit L2. In a case where the value f1/f2 is lower than the lower limit of inequality (4), the refractive power of the second lens unit L2 becomes too strong relative to the refractive power of the first lens unit L1, and fluctuations in coma increase during zooming. In a case where the value f1/f2 is higher than the upper limit of inequality (4), the refractive power of the first lens unit L1 becomes too strong relative to the refractive power of the second lens unit L2, and the fluctuations in curvature of field increase during zooming.

Inequality (5) defines a distance on the optical axis of the first lens unit L1 relative to the overall optical length at the wide-angle end. In a case where the value D1/TL is lower than the lower limit of inequality (5), the distance on the optical axis of the first lens unit L1 relative to the overall optical length becomes short. Thereby, the air gap between the negative lens L11 and the positive lens L12 in the first lens unit L1 becomes narrow, and it becomes difficult to correct lateral chromatic aberration on the wide-angle side and spherical aberration on the telephoto side. In a case where the value D1/TL is higher than the upper limit of inequality (5), the distance on the optical axis of the first lens unit L1 relative to the overall optical length increases, and the air gap between the negative lens L11 and the positive lens L12 widens, and it becomes difficult to correct distortion.

Inequality (6) defines the Abbe number of the glass materials of the first lens unit L1. In a case where the value vd1n-vd1p is lower than the lower limit of inequality (6), the Abbe number difference between the negative lens L11 and the positive lens L12 of the first lens unit L1 becomes small, and it becomes difficult to correct longitudinal chromatic aberration and lateral chromatic aberration. In a case where the value vd1n-vd1p is higher than the upper limit of inequality (6), the difference in Abbe number between the negative lens L11 and the positive lens L12 of the first lens unit L1 increases, which is beneficial to chromatic aberration correction, but the refractive power, particularly of the positive lens L12, becomes weaker, and it becomes difficult to correct distortion.

Inequality (7) defines a ratio between the focal length of the first lens unit L1 and the focal length of the lens unit located closest to the image plane in the subsequent group located on the image side of the second lens unit L2. In a case where the value f1/fimg is lower than the lower limit of inequality (7), the refractive power of the lens unit located closest to the image plane of the subsequent lens unit relative to the first lens unit L1 becomes weaker, which is beneficial to distortion correction, but it becomes difficult to correct lateral chromatic aberration over the entire zoom range. In addition, an incident angle of an off-axis light ray onto the image sensor becomes higher, and causes color shading and the like. In a case where the value f1/fimg is higher than the upper limit of inequality (7), the refractive power of the lens unit located closest to the image plane in the subsequent group increases relative to the refractive power of the first lens unit L1, which is beneficial to correction of lateral chromatic aberration and color shading, but it becomes difficult to correct distortion.

Inequality (8) defines the shape of the air lens determined by the radius of curvature of the lens surface on the image side of the negative lens L11 in the first lens unit L1 and the radius of curvature of the lens surface on the object side of the positive lens L12. In a case where the value (R1r+R2f)/(R1r−R2f) is lower than the lower limit of inequality (8), the curvature of the lens surface on the image side of the negative lens L11 becomes weaker, which is beneficial to the reduction of the frequency of surface reflection ghosts, but it becomes difficult to correct distortion. In a case where the value (R1r+R2f)/(R1r−R2f) is higher than the upper limit of inequality (8), the curvature of the lens surface on the object side of the positive lens L12 becomes weaker, and it becomes difficult to correct curvature of field.

Inequalities (3) to (8) may be replaced with the following inequalities (3a) to (8a):

$$1.62 < Ndave < 1.81 \tag{3a}$$

$$-1.9 < f1/f2 < -1.1 \tag{4a}$$

$$0.07 < D1/TL < 0.28 \tag{5a}$$

$$27.0 < vd1n - vd1p < 40.0 \tag{6a}$$

$$-0.53 < f1/fimg < -0.05 \tag{7a}$$

$$-23.0 < (R1r+R2f)/(R1r-R2f) < -6.0 \tag{8a}$$

Inequalities (3) to (8) may be replaced with the following inequalities (3b) to (8b):

$$1.650 < Ndave < 1.805 \tag{3b}$$

$$-1.8 < f1/f2 < -1.2 \tag{4b}$$

$$0.10 < D1/TL < 0.25 \tag{5b}$$

$$30.0 < vd1n - vd1p < 40.0 \tag{6b}$$

$$-0.50 < f1/fimg < -0.05 \tag{7b}$$

$$-20.0 < (R1r+R2f)/(R1r-R2f) < -8.0 \tag{8b}$$

A detailed description will now be given of the zoom lens according to each example.

The zoom lenses according to Examples 1 and 3 consist of, in order from the object side to the image side, the first lens unit L1 having negative refractive power, the second lens unit L2 having positive refractive power, the third lens unit L3 having negative refractive power, the fourth lens unit L4 having negative refractive power, and the fifth lens unit L5 having positive refractive power. The aperture stop SP is disposed in the second lens unit L2 and moves integrally with the second lens unit L2 during zooming.

The zoom lenses according to Examples 1 and 3 perform magnification variation by moving the second lens unit L2, the third lens unit L3, and the fourth lens unit L4 toward the object side during zooming from the wide-angle end to the telephoto end. The first lens unit L1 is moved toward the image side, and then moved toward the object side (along a convex locus (trajectory) toward the image side) so as to correct fluctuations in the image plane along with magnification variation. The fifth lens unit L5 is fixed relative to the image plane.

The zoom lenses according to Examples 1 and 3 employ an inner focus system in which focusing is performed by moving the third lens unit L3 along the optical axis. A solid line 3a and a dotted line 3b are moving loci for correcting image plane fluctuations caused by magnification variation during focusing on an infinity object and a short distance (close) object, respectively. Moving the third lens unit L3 toward the object side can effectively utilize the space between the second lens unit L2 and the fourth lens unit L4, and reduce the overall optical length.

During focusing from an infinity object to a short distance object at the telephoto end, the third lens unit L3 is retracted backward as indicated by an arrow 3c. While the first lens unit L1 is fixed during focusing, it may be moved as necessary to correct aberrations.

The zoom lens according to Example 2 consists of, in order from the object side to the image side, a first lens unit L1 having negative refractive power, a second lens unit L2 having positive refractive power, a third lens unit L3 having positive refractive power, a fourth lens unit L4 having negative refractive power, a fifth lens unit L5 having negative refractive power, and a sixth lens unit L6 having positive refractive power. The aperture stop SP is disposed in the second lens unit L2 and moves integrally with the second lens unit L2 during zooming.

The zoom lens according to Example 2 performs magnification variation by moving the second lens unit L2 to the fifth lens unit L5 toward the object side during zooming from the wide-angle end to the telephoto end. The first lens unit L1 toward the image side, and then moved toward the object side (along a convex locus toward the image side) so as to correct fluctuations in the image plane along with magnification variation. The sixth lens unit L6 is fixed relative to the image plane.

The zoom lens according to Example 2 employs an inner focus system in which focusing is performed by moving the third lens unit L3 along the optical axis. A solid line 3a and a dotted line 3b are moving loci for correcting image plane fluctuations caused by magnification variation during focusing on an infinity object and a short distance object, respectively. Moving the third lens unit L3 toward the object side can effectively utilize the space between the second lens unit L2 and the fourth lens unit L4, and reduce the overall optical length.

During focusing from the infinity object to the short distance object at the telephoto end, the third lens unit L3 moves forward as indicated by an arrow 3c. While the first lens unit L1 is fixed during focusing, it may be moved as necessary to correct aberrations.

The zoom lens according to Example 4 consists of, in order from the object side to the image side, a first lens unit L1 having negative refractive power, a second lens unit L2 having positive refractive power, a third lens unit L3 having negative refractive power, and a fourth lens unit L4 having positive refractive power.

The zoom lens according to Example 4 performs magnification variation by moving the second lens unit L2, the third lens unit L3, and the fourth lens unit L4 toward the object side during zooming from the wide-angle end to the telephoto end. In addition, the first lens unit L1 is moved toward the image side, and then moved toward the object side (along a convex locus toward the image side) so as to correct fluctuations in the image plane along with magnification variation.

The zoom lens according to Example 4 employs an inner focus system in which focusing is performed by moving the third lens unit L3 along the optical axis. A solid line 3a and a dotted line 3b are moving loci for correcting image plane fluctuations caused by magnification variation during focusing on an infinity object and a short distance object, respectively. Moving the third lens unit L3 toward the object side can effectively utilize the space between the second lens unit L2 and the fourth lens unit L4, and reduce the overall optical length.

During focusing from the infinity object to the short distance object at the telephoto end, the third lens unit L3 is retracted backward as indicated by an arrow 3c. While the first lens unit L1 is fixed during focusing, it may be moved as necessary to correct aberrations.

The zoom lens according to Example 5 consists of, in order from the object side to the image side, a first lens unit L1 having negative refractive power, a second lens unit L2 having positive refractive power, a third lens unit L3 having positive refractive power, a fourth lens unit L4 having negative refractive power, and a fifth lens unit L5 having positive refractive power.

The zoom lens according to Example 5 performs magnification variation by moving the second lens unit L2, the third lens unit L3, and the fourth lens unit L4 toward the object side during zooming from the wide-angle end to the telephoto end. The first lens unit L1 is moved toward the image side, and then moved toward the object side (along a convex locus toward the image side) so as to correct fluctuations in the image plane along with the magnification variation. The fifth lens unit L5 is fixed relative to the image plane.

The zoom lens according to Example 5 employs an inner focus system in which focusing is performed by moving the third lens unit L3 along the optical axis. A solid line 3a and a dotted line 3b are moving loci for correcting image plane fluctuations caused by zooming during focusing on an infinity object and a short distance object, respectively. Moving the third lens unit L3 toward the object side can effectively utilize the space between the second lens unit L2 and the fourth lens unit L4, and reduce the overall optical length.

During focusing from the infinity object to the short distance object at the telephoto end, the third lens unit L3 is retracted backward as indicated by an arrow 3c. While the first lens unit L1 is fixed during focusing, it may be moved as necessary to correct aberrations.

In each example, the aperture stop SP is disposed in the second lens unit L2 and moves integrally with the second lens unit L2 during zooming.

Each example moves at least part of the second lens unit L2 in a direction having a component in the direction orthogonal to the optical axis during imaging, and thereby shifts an image in the direction orthogonal to the optical axis. Thereby, each example can correct blurs of a captured image (image plane movement of the object image) in a case where the entire zoom lens vibrates.

Each example may correct distortion among various aberrations by electrical image processing. In particular, the front lens diameter can be reduced by making the effective imaging range (effective image circle diameter) of the image sensor on the wide-angle side smaller than the effective imaging range on the telephoto end and by correcting distortion.

In each example, the first lens unit L1 consists of a negative lens having concave lens surfaces on both sides (object side and image side) and a positive meniscus lens having a convex lens surface on the object side. In the zoom lens according to each example, the refractive power of the first lens unit L1 is increased within a proper range for miniaturization. In a case where the refractive power is increased, various aberrations significantly occur in the first lens unit L1, especially distortion and curvature of field at the wide-angle end. Accordingly, for distortion in particular, curvature of field is satisfactorily corrected by applying electronic distortion correction.

In Example 1, the second lens unit L2 includes, in order from the object side to the image side, a positive lens having convex lens surfaces on both sides, a cemented lens of a positive lens having a convex lens surface on the object side and a negative lens having a concave lens surface on the image side, and a positive lens having a convex lens surface on the object side. In the zoom lens according to Example 1, the refractive power of the second lens unit L2 is increased within a proper range in order to increase the magnification variation ratio. In a case where the refractive power is increased, various aberrations, particularly spherical aberration and longitudinal chromatic aberration, significantly occur in the second lens unit L2. In Example 1, the positive refractive power of the second lens unit L2 is shared between the two positive lenses and the cemented lens, and spherical aberration is suppressed. Longitudinal chromatic aberration is suppressed by using glass with anomalous dispersion for the positive lens and by placing the cemented lens.

In Examples 2 and 5, the second lens unit L2 consists of, in order from the object side to the image side, a positive lens having convex lens surfaces on both sides, and a cemented lens of a positive lens having a convex lens surface on the object side and a negative lens having a concave lens surface on the object side. In the zoom lenses according to Examples 2 and 5, the refractive power of the second lens unit L2 is increased within a proper range in order to increase the magnification variation ratio. In a case where the refractive power is increased, various aberrations, particularly spherical aberration and longitudinal chromatic aberration, significantly occur in the second lens unit L2. In Examples 2 and 5, the positive refractive power of the second lens unit L2 is shared between the positive lens and cemented lens, and spherical aberration is suppressed. Longitudinal chromatic aberration is suppressed by using glass with anomalous dispersion for the positive lens and disposing a cemented lens.

In Examples 3 and 4, the second lens unit L2 consists of, in order from the object side to the image side, a positive lens having convex lens surfaces on both sides, a positive lens having a convex lens surface on the object side, and a positive lens having a convex lens surface on both sides. In the zoom lenses according to Examples 3 and 4, the refractive power of the second lens unit L2 is increased within a proper range in order to increase the magnification variation ratio. In a case where the refractive power is increased, various aberrations, particularly spherical aberration and longitudinal chromatic aberration, significantly occur in the second lens unit L2. In Examples 3 and 4, the positive refractive power of the second lens unit L2 is shared by the three positive lenses, and spherical aberration is suppressed. Longitudinal chromatic aberration is suppressed by using glass with anomalous dispersion for the positive lens and by placing a cemented lens.

In Example 1, the third lens unit L3 consists of a negative lens having a convex lens surface on the object side. Thereby, the weight of the zoom lens can be reduced.

In Examples 2 and 5, the third lens unit L3 consists of a positive meniscus lens having a concave lens surface on the object side. During focusing, various aberrations, especially chromatic aberration and curvature of field, significantly occur due to the third lens unit. Forming the lens surface on the object side of the positive lens into a concave surface can suppress a change in curvature of field during focusing, particularly on the wide-angle side. Using a low-dispersion material, fluctuations in longitudinal chromatic aberration and lateral chromatic aberration during focusing are suppressed.

In Examples 3 and 4, the third lens unit L3 consists of a negative lens having a concave lens surface on the object side. Thereby, the weight of the zoom lens can be reduced.

During focusing, various aberrations, especially chromatic aberration and curvature of field, significantly occur due to the third lens unit. Forming the lens surface on the object side of the negative lens into a concave surface can suppress fluctuations in curvature of field during focusing, especially on the wide-angle side. In addition, since a sufficient amount of high-dispersion material is not used, variations in longitudinal chromatic aberration and lateral chromatic aberration during focusing are suppressed.

In Examples 1, 2, 3, and 5, the fourth lens unit L4 consists of a negative lens having a concave lens surface on the object side. Thereby, the weight of the zoom lens can be reduced. Making the lens surface on the object side concave can suppress the curvature of field.

In Example 4, the fourth lens unit L4 consists of, in order from the object side to the image side, a negative lens having a concave lens surface on the object side and a positive lens having a convex lens surface on the image side. Making the lens surface on the object side of the negative lens concave can suppress the curvature of field, and making the lens surface on the image side of the positive lens convex can correct the curvature of field and suppress the angle of a light ray incident on the image sensor. In addition, lateral chromatic aberration is corrected over the entire zoom range.

In Examples 1, 3, and 5, the fifth lens unit L5 consists of a positive lens having a convex lens surface on the image side. Thereby, the zoom lens can be made thinner and lighter. A meniscus shape that is convex on the image side can correct the curvature of field and suppress the angle of light incident on the image sensor. In addition, lateral chromatic aberration is corrected over the entire zoom range.

In Example 2, the fifth lens unit L5 consists of a negative lens having a concave lens surface on the object side. Thereby, the weight of the zoom lens can be reduced. Making the lens surface on the object side concave can suppress the curvature of field.

In Example 2, the sixth lens unit L6 consists of a positive lens with a convex lens surface on the image side. Thereby, the zoom lens can be made thinner and lighter. Forming a meniscus shape that is convex on the image side can correct the curvature of field and suppress the angle of light incident on the image sensor. In addition, lateral chromatic aberration is corrected over the entire zoom range.

A description will now be given of numerical examples 1 to 5 corresponding to Examples 1 to 5.

In surface data of each numerical example, r represents a radius of curvature of each optical surface, and d (mm) is an on-axis distance (distance on the optical axis) between an m-th surface and an (m+1)-th surface, where m is a surface number counted from the light incident side. nd represents a refractive index for the d-line of each optical member, and vd represents an Abbe number of the optical member. The Abbe number vd of a certain material is expressed as follows:

$$vd=(Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

In each numerical example, values of d, a focal length (mm), an F-number, and a half angle of view (degrees) are set in a case where the zoom lens according to each example is in the in-focus state on an infinity object. "Back focus" is a distance on the optical axis from the final lens surface (lens surface closest to the image plane) to the paraxial image plane expressed in air conversion length. The "overall lens length" is a length obtained by adding the back focus to the distance on the optical axis from the foremost lens surface (the lens surface closest to the object) to the final lens surface of the zoom lens. The term "lens unit" includes one or more lenses.

In a case where the optical surface is aspheric, an asterisk * is attached to the right side of the surface number. The aspherical shape is expressed as follows:

$$X = (h^2/R)/[1+\{1-(1+K)(h/R)^2\}^{1/2}] + A4 \times h^4 + A6 \times h^6 + A8 \times h^8 + A10 \times h^{10} + A12 \times h^{12}$$

where X is a displacement amount from a surface vertex in the optical axis direction, h is a height from the optical axis in a direction orthogonal to the optical axis, a light traveling direction is set positive, R is a paraxial radius of curvature, K is a conic constant, and A4, A6, A8, A10, and A12 are aspherical coefficients. "e±XX" in each aspheric coefficient means "×10$^{\pm XX}$."

NUMERICAL EXAMPLE 1
UNIT: mm

SURFACE DATA

| Surface No. | r | d | nd | vd |
|---|---|---|---|---|
| 1 | −221.703 | 1.50 | 1.72916 | 54.7 |
| 2 | 16.954 | 6.40 | | |
| 3 | 19.000 | 2.25 | 1.86966 | 20.0 |
| 4 | 23.218 | (Variable) | | |
| 5 | 81.919 | 1.76 | 1.48749 | 70.2 |
| 6 | −38.105 | 0.80 | | |
| 7 | 14.108 | 2.23 | 1.77250 | 49.6 |
| 8 | −2156.210 | 0.80 | 1.84666 | 23.9 |
| 9 | 26.439 | 2.79 | | |
| 10 (Aperture Stop) | ∞ | 1.58 | | |
| 11* | 18.076 | 1.51 | 1.52996 | 55.8 |
| 12 | 46.213 | (Variable) | | |
| 13 | 118.680 | 0.69 | 1.63980 | 34.5 |
| 14 | 23.627 | (Variable) | | |
| 15* | −59.048 | 1.80 | 1.52996 | 55.8 |
| 16* | 531.466 | (Variable) | | |
| 17 | −49.248 | 3.24 | 1.63854 | 55.4 |
| 18 | −24.671 | 9.14 | | |
| 19 | ∞ | 1.24 | 1.51633 | 64.1 |
| 20 | ∞ | 0.50 | | |
| Image Plane | ∞ | | | |

ASPHERIC DATA

11th Surface
K = 0.00000e+000 A4 = −1.60955e−005
A6 = 9.84373e−009 A8 = −4.92746e−009
15th Surface
K = 0.00000e+000 A4 = −8.27348e−004
A6 = 3.81277e−006 A8 = −1.90156e−007
16th Surface
K = 0.00000e+000 A4 = −6.32281e−004
A6 = 5.39691e−006 A8 = −1.06321e−007
A10 = 5.46165e−010 A12 = 2.87290e−012

VARIOUS DATA

| Zooming Ratio | | 2.81 | |
|---|---|---|---|
| | Wide-Angle | Middle | Telephoto |
| Focal Length | 15.36 | 29.82 | 43.10 |
| FNo | 3.60 | 5.10 | 6.44 |
| Half Angle of View (Degrees) | 35.76 | 23.75 | 17.59 |
| Overall Lens Length | 76.36 | 68.85 | 73.51 |
| BF | 10.45 | 10.45 | 10.45 |
| d 4 | 27.55 | 8.81 | 2.88 |
| d12 | 1.00 | 2.08 | 2.50 |
| d14 | 8.81 | 7.73 | 7.31 |
| d16 | 1.20 | 12.44 | 23.02 |

Zoom Lens Unit Data

| Lens Unit | Starting Surface | Focal Length | Lens Structure Length |
|---|---|---|---|
| 1 | 1 | −28.56 | 10.15 |
| 2 | 5 | 17.46 | 11.46 |
| 3 | 13 | −46.24 | 0.69 |
| 4 | 15 | −100.17 | 1.80 |
| 5 | 17 | 73.64 | 3.24 |

NUMERICAL EXAMPLE 2
UNIT: mm

SURFACE DATA

| Surface No. | r | d | nd | vd |
|---|---|---|---|---|
| 1 | −341.387 | 1.50 | 1.72916 | 54.7 |
| 2 | 16.611 | 7.01 | | |
| 3 | 20.001 | 2.36 | 1.86966 | 20.0 |
| 4 | 25.742 | (Variable) | | |
| 5 | 91.610 | 2.86 | 1.48749 | 70.2 |
| 6 | −37.884 | 0.80 | | |
| 7 | 12.397 | 3.07 | 1.49700 | 81.5 |
| 8 | −29.591 | 0.80 | 1.84666 | 23.9 |
| 9 | −101.644 | 2.19 | | |
| 10 (Aperture Stop) | ∞ | (Variable) | | |
| 11 | −9.274 | 2.67 | 1.52996 | 55.8 |
| 12* | −7.981 | (Variable) | | |
| 13 | −20.001 | 0.50 | 1.53172 | 48.8 |
| 14 | 73.408 | (Variable) | | |
| 15* | −49.333 | 1.80 | 1.52996 | 55.8 |
| 16* | −722.713 | (Variable) | | |
| 17 | −65.372 | 3.34 | 1.63854 | 55.4 |
| 18 | −27.178 | 8.97 | | |
| 19 | ∞ | 1.24 | 1.51633 | 64.1 |
| 20 | ∞ | 0.40 | | |
| Image Plane | ∞ | | | |

ASPHERIC DATA

12th Surface
K = 0.00000e+000 A4 = 1.82762e−004
A6 = 1.07093e−006 A8 = 2.26228e−008
15th Surface
K = 0.00000e+000 A4 = −8.40887e−004
A6 = 5.52694e−006 A8 = −2.71953e−007
16th Surface
K = 0.00000e+000 A4 = −6.80450e−004
A6 = 6.84480e−006 A8 = −1.58780e−007
A10 = 8.96963e−010 A12 = 3.78436e−012

VARIOUS DATA

| Zooming Ratio | | 2.80 | |
|---|---|---|---|
| | Wide-Angle | Middle | Telephoto |
| Focal Length | 15.37 | 29.58 | 43.10 |
| FNo | 3.60 | 5.10 | 6.44 |
| Half Angle of View (Degrees) | 35.41 | 24.79 | 17.59 |
| Overall Lens Length | 79.34 | 71.19 | 76.32 |
| BF | 10.18 | 10.18 | 10.18 |
| d4 | 28.75 | 9.05 | 2.85 |
| d10 | 5.04 | 4.05 | 4.20 |
| d12 | 2.16 | 3.14 | 2.99 |
| d14 | 3.13 | 2.98 | 3.08 |
| d16 | 1.20 | 12.90 | 24.13 |

NUMERICAL EXAMPLE 2
UNIT: mm

Zoom Lens Unit Data

| Lens Unit | Starting Surface | Focal Length | Lens Structure Length |
|---|---|---|---|
| 1 | 1 | −30.51 | 10.86 |
| 2 | 5 | 18.52 | 9.72 |
| 3 | 11 | 63.00 | 2.67 |
| 4 | 13 | −29.51 | 0.50 |
| 5 | 15 | −100.00 | 1.80 |
| 6 | 17 | 70.45 | 3.34 |

NUMERICAL EXAMPLE 3
UNIT: mm

SURFACE DATA

| Surface No. | r | d | nd | vd |
|---|---|---|---|---|
| 1 | −150.623 | 1.50 | 1.69680 | 55.5 |
| 2 | 16.269 | 6.20 | | |
| 3 | 20.011 | 1.73 | 1.86966 | 20.0 |
| 4 | 23.350 | (Variable) | | |
| 5 | 70.536 | 1.88 | 1.49700 | 81.5 |
| 6 | −49.791 | 0.80 | | |
| 7 | 12.726 | 3.00 | 1.43875 | 94.7 |
| 8 | −287.059 | 3.11 | | |
| 9 (Aperture Stop) | ∞ | 2.03 | | |
| 10* | 60.291 | 1.46 | 1.52996 | 55.8 |
| 11 | −69.115 | (Variable) | | |
| 12 | −40.276 | 0.69 | 1.84666 | 23.8 |
| 13 | 57.069 | (Variable) | | |
| 14* | −92.031 | 1.80 | 1.52996 | 55.8 |
| 15* | 125.793 | (Variable) | | |
| 16 | −49.501 | 2.20 | 2.00100 | 29.1 |
| 17 | −30.472 | 14.74 | | |
| 18 | ∞ | 1.24 | 1.51633 | 64.1 |
| 19 | ∞ | 0.80 | | |
| Image Plane | ∞ | | | |

ASPHERIC DATA

10th Surface
K = 0.00000e+000 A4 = −6.01966e−005
A6 = −3.91592e−007 A8 = −1.70536e−009
14th Surface
K = 0.00000e+000 A4 = −1.53655e−004
A6 = −8.28544e−007 A8 = −1.38307e−008
15th Surface
K = 0.00000e+000 A4 = −4.34108e−005
A6 = −6.49568e−007 A8 = 2.61485e−009
A10 = −1.05673e−011 A12 = −9.76960e−014

VARIOUS DATA

| Zooming Ratio | | 2.34 | |
|---|---|---|---|
| | Wide-Angle | Middle | Telephoto |
| Focal Length | 18.45 | 27.50 | 43.10 |
| FNo | 3.60 | 5.10 | 6.44 |
| Half Angle of View (Degree) | 33.38 | 26.42 | 17.59 |
| Overall Lens Length | 76.53 | 74.08 | 79.82 |
| BF | 16.35 | 16.35 | 16.35 |
| d4 | 23.51 | 13.20 | 5.60 |
| d11 | 1.00 | 1.89 | 2.97 |
| d13 | 8.07 | 7.18 | 6.10 |
| d15 | 1.20 | 9.06 | 22.40 |

NUMERICAL EXAMPLE 3
UNIT: mm

Zoom Lens Unit Data

| Lens Unit | Starting Surface | Focal Length | Lens Structure Length |
|---|---|---|---|
| 1 | 1 | −25.48 | 9.43 |
| 2 | 5 | 16.26 | 12.29 |
| 3 | 12 | −27.80 | 0.69 |
| 4 | 14 | −100.00 | 1.80 |
| 5 | 16 | 74.87 | 2.20 |

NUMERICAL EXAMPLE 4
UNIT: mm

SURFACE DATA

| Surface No. | r | d | nd | vd |
|---|---|---|---|---|
| 1 | −252.461 | 1.50 | 1.72916 | 54.1 |
| 2 | 15.797 | 5.90 | | |
| 3 | 18.000 | 1.77 | 1.86966 | 20.0 |
| 4 | 20.885 | (Variable) | | |
| 5 | 89.653 | 2.50 | 1.53775 | 74.7 |
| 6 | −45.386 | 0.93 | | |
| 7 | 15.971 | 1.78 | 1.49700 | 81.5 |
| 8 | 47.272 | 4.06 | | |
| 9 (Aperture Stop) | ∞ | 3.42 | | |
| 10* | 21.807 | 1.96 | 1.61881 | 63.9 |
| 11 | −69.019 | (Variable) | | |
| 12 | −46.391 | 0.69 | 1.84666 | 23.8 |
| 13 | 40.560 | (Variable) | | |
| 14* | −62.649 | 1.80 | 1.52996 | 55.8 |
| 15* | 347.360 | 1.60 | | |
| 16 | −984.110 | 1.85 | 1.84666 | 23.8 |
| 17 | −64.571 | (Variable) | | |
| 18 | ∞ | 1.24 | 1.51633 | 64.1 |
| 19 | ∞ | 0.80 | | |
| Image Plane | ∞ | | | |

ASPHERIC DATA

10th Surface
K = 0.00000e+000 A4 = −8.42933e−006
A6 = 2.07057e−008 A8 = −3.39997e−009
14th Surface
K = 0.00000e+000 A4 = −5.60602e−004
A6 = 2.48288e−006 A8 = −4.37242e−008
15th Surface
K = 0.00000e+000 A4 = −4.60981e−004
A6 = 3.46057e−006 A8 = −3.85721e−008
A10 = 1.88701e−010 A12 = −7.21451e−014

VARIOUS DATA

| Zooming Ratio | | 2.34 | |
|---|---|---|---|
| | Wide-Angle | Middle | Telephoto |
| Focal Length | 18.45 | 28.83 | 43.10 |
| FNo | 4.10 | 5.10 | 6.44 |
| Half Angle of View (Degrees) | 31.58 | 24.27 | 17.59 |
| Overall Lens Length | 80.15 | 75.55 | 79.38 |
| BF | 13.47 | 22.09 | 33.69 |
| d 4 | 23.85 | 10.62 | 2.85 |
| d11 | 1.10 | 1.74 | 2.42 |
| d13 | 11.98 | 11.34 | 10.66 |
| d17 | 11.85 | 20.48 | 32.07 |

Zoom Lens Unit Data

| Lens Unit | Starting Surface | Focal Length | Lens Structure Length |
|---|---|---|---|
| 1 | 1 | −24.99 | 9.17 |
| 2 | 5 | 16.31 | 14.65 |

-continued

NUMERICAL EXAMPLE 4
UNIT: mm

| 3 | 12 | −25.47 | 0.69 |
|---|----|--------|------|
| 4 | 14 | 368.65 | 5.25 |

NUMERICAL EXAMPLE 5
UNIT: mm

SURFACE DATA

| Surface No. | r | d | nd | vd |
|---|---|---|---|---|
| 1 | −77.809 | 1.50 | 1.72916 | 54.7 |
| 2 | 17.097 | 5.16 | | |
| 3 | 20.021 | 3.05 | 1.86966 | 20.0 |
| 4 | 27.367 | (Variable) | | |
| 5 | 55.630 | 2.98 | 1.56883 | 56.4 |
| 6 | −51.682 | 2.20 | | |
| 7 | 19.665 | 4.35 | 1.74400 | 44.8 |
| 8 | −25.430 | 0.80 | 1.85478 | 24.8 |
| 9 | 43.298 | 2.67 | | |
| 10 (Aperture Stop) | ∞ | (Variable) | | |
| 11 | −11.905 | 2.80 | 1.52996 | 55.8 |
| 12* | −9.550 | (Variable) | | |
| 13* | −44.138 | 1.80 | 1.52996 | 55.8 |
| 14* | −267.817 | (Variable) | | |
| 15 | −53.904 | 2.68 | 1.76385 | 48.5 |
| 16 | −40.703 | 9.31 | | |
| 17 | ∞ | 1.24 | 1.51633 | 64.1 |
| 18 | ∞ | 0.75 | | |
| Image Plane | ∞ | | | |

ASPHERIC DATA

12th Surface
K = 0.00000e+000 A4 = 1.41225e−004
A6 = 3.07007e−008 A8 = 9.90101e−009
13th Surface
K = 0.00000e+000 A4 = −1.61841e−004
A6 = −2.52945e−006
14th Surface
K = 0.00000e+000 A4 = −2.11078e−004
A6 = −1.23425e−006 A8 = 1.66060e−010
A10 = 4.99808e−011

VARIOUS DATA

| Zooming Ratio | | 2.66 | |
|---|---|---|---|
| | Wide-Angle | Middle | Telephoto |
| Focal Length | 16.23 | 34.90 | 43.10 |
| FNo | 3.61 | 5.10 | 6.44 |
| Half Angle of View (Degrees) | 32.27 | 20.40 | 17.59 |
| Overall Lens Length | 88.10 | 84.74 | 88.68 |
| BF | 10.87 | 10.87 | 10.87 |
| d4 | 28.75 | 6.96 | 3.20 |
| d10 | 5.45 | 6.50 | 6.50 |
| d12 | 6.44 | 6.85 | 7.57 |
| d14 | 6.58 | 23.57 | 30.55 |

Zoom Lens Unit Data

| Lens Unit | Starting Surface | Focal Length | Lens Structure Length |
|---|---|---|---|
| 1 | 1 | −26.81 | 9.71 |
| 2 | 5 | 26.53 | 13.00 |
| 3 | 11 | 64.54 | 2.80 |
| 4 | 13 | −100.00 | 1.80 |
| 5 | 15 | 200.00 | 2.68 |

Table 1 summarizes various values in each numerical example.

TABLE 1

| | (1) | (2) | (3) | (4) | (5) | (6) | (7) | (8) |
|---|---|---|---|---|---|---|---|---|
| ex1 | −4.47 | 0.81 | 1.799 | 1.64 | 0.13 | 34.66 | −0.39 | −17.57 |
| ex2 | −3.99 | 0.86 | 1.799 | 1.65 | 0.14 | 34.66 | −0.43 | −10.80 |
| ex3 | −6.18 | 0.73 | 1.783 | 1.57 | 0.12 | 35.51 | −0.34 | −9.69 |
| ex4 | −5.73 | 0.85 | 1.799 | 1.53 | 0.11 | 34.07 | −0.07 | −15.34 |
| ex5 | −3.76 | 0.48 | 1.799 | 1.01 | 0.11 | 34.66 | −0.13 | −12.69 |

Image Pickup Apparatus

Figure 11:
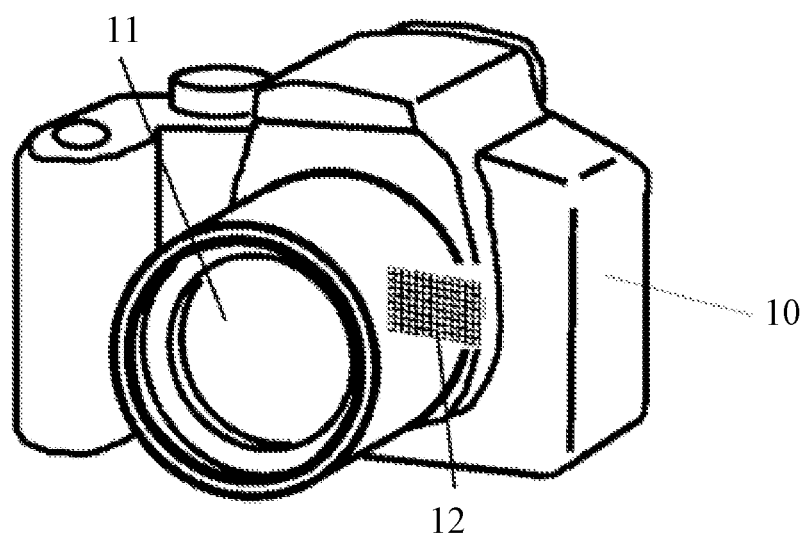
FIG. 11 is a schematic diagram of an image pickup apparatus.

Referring now to FIG. 11, a description will be given of a digital still camera (image pickup apparatus) using the zoom lens according to each example as an imaging optical system. In FIG. 11, reference numeral 10 denotes a camera body, and reference numeral 11 denotes an imaging optical system including any one of the zoom lenses according to Examples 1 to 5. Reference numeral 12 denotes a solid-state image sensor (photoelectric conversion element) such as a CCD sensor or a CMOS sensor built in the camera body 10 and configured to receive and photoelectrically convert an optical image formed by the imaging optical system 11. The camera body 10 may be a so-called single-lens reflex camera having a quick turn mirror, or a so-called mirrorless camera without a quick turn mirror.

Applying the zoom lens according to each example to an image pickup apparatus such as a digital still camera can provide an image pickup apparatus having a small lens.

Imaging System

An imaging system (surveillance camera system) may include the zoom lens according to each example and a control unit configured to control the zoom lens. The control unit can control the zoom lens so that each lens unit moves as described above during zooming, focusing, and image stabilization. The control unit may not be integrated with the zoom lens, and the control unit may be provided separately from the zoom lens. For example, the control unit (control apparatus) provided remotely from a driving unit configured to drive each lens in the zoom lens may include a transmitter configured to transmit a control signal (command) for controlling the zoom lens. Such a control unit can remotely control the zoom lens.

The control unit may include an operation unit such as a controller and a button for remotely operating the zoom lens, and may control the zoom lens according to the input of the user to the operation unit. For example, the operation unit may include an enlargement button and a reduction button. A signal may be sent from the control unit to the driving unit of the zoom lens so that in a case where the user presses the enlarge button, the magnification of the zoom lens increases, and in a case where the user presses the reduce button, the magnification of the zoom lens decreases.

The imaging system may also include a display unit such as a liquid crystal panel configured to display information (moving state) about zoom of the zoom lens. The information about the zoom of the zoom lens is, for example, the zoom magnification (zoom state) and the moving amount (moving state) of each lens unit. The user can remotely operate the zoom lens through the operation unit while viewing the information about the zoom of the zoom lens displayed on the display unit. The display unit and the operation unit may be integrated by adopting a touch panel or the like.

Each example can provide a zoom lens having high optical performance in an overall zoom range.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-096261, filed on Jun. 15, 2022, which is hereby incorporated by reference herein in its entirety.

What is claimed is:

1. A zoom lens comprising, in order from an object side to an image side, a first lens unit having negative refractive power and a second lens unit having positive refractive power,
wherein a distance between adjacent lens units changes during zooming,
wherein the first lens unit includes a plurality of lenses, the plurality of lenses consisting of a negative lens having a concave lens surface on the image side, and a positive lens having a convex lens surface on the object side and disposed on the image side of the negative lens via an air gap, and,
wherein the following inequalities are satisfied:

$$-7.00 < f12/f11 < -3.70$$

$$0.40 < (R1f+R2r)/(R1f-R2r) < 1.00$$

where f11 is a focal length of the negative lens, f12 is a focal length of the positive lens, R1f is a radius of curvature of a lens surface on the object side of the negative lens, and R2r is a radius of curvature of a lens surface on the image side of the positive lens.

2. The zoom lens according to claim 1, wherein the following inequality is satisfied:

$$1.60 < Ndave < 1.81$$

where Ndave is an average refractive index of the negative lens and the positive lens.

3. The zoom lens according to claim 1, wherein the following inequality is satisfied:

$$-2.0 < f1/f2 < -1.0$$

where f1 is a focal length of the first lens unit, and f2 is a focal length of the second lens unit.

4. The zoom lens according to claim 1, wherein the following inequality is satisfied:

$$< D1/TL < 0.30$$

where D1 is a distance on an optical axis from the lens surface on the object side of the negative lens to the lens surface on the image side of the positive lens, and TL is a distance on the optical axis from the lens surface on the object side of the negative lens to an image plane at a wide-angle end.

5. The zoom lens according to claim 1, wherein the following inequality is satisfied:

$$25.0 < vd1n - vd1p < 40.0$$

where vd1n is an Abbe number of the negative lens and vd1p is an Abbe number of the positive lens.

6. The zoom lens according to claim 1, further comprising a subsequent group disposed on the image side of the second lens unit and including one or more lens units,
wherein the following inequality is satisfied:

$$-0.55 < f1/fimg < -0.05$$

where f1 is a focal length of the first lens unit, and fimg is a focal length of a lens unit disposed closest to the image plane of the subsequent group.

7. The zoom lens according to claim 6, wherein the subsequent group includes a plurality of lens units, which consist of, in order from the object side to the image side, a third lens unit having negative refractive power and a fourth lens unit having positive refractive power.

8. The zoom lens according to claim 6, wherein the subsequent group includes a plurality of lens units, which consist of, in order from the object side to the image side, a third lens unit having negative refractive power, a fourth lens unit having negative refractive power, and a fifth lens unit having positive refractive power.

9. The zoom lens according to claim 6, wherein the subsequent group includes a plurality of lens units, which consist of, in order from the object side to the image side, a third lens unit having positive refractive power, a fourth lens unit having negative refractive power, and a fifth lens unit having positive refractive power.

10. The zoom lens according to claim 6, wherein the subsequent group includes a plurality of lens units, which consist of, in order from the object side to the image side, a third lens unit having positive refractive power, a fourth lens unit having negative refractive power, a fifth lens unit having negative refractive power, and a sixth lens unit having positive refractive power.

11. The zoom lens according to claim 1, wherein the following inequality is satisfied:

$$-25.0 < (R1r+R2f)/(R1r-R2f) < -5.0$$

where R1r is a radius of curvature of the lens surface on the image side of the negative lens, and R2f is a radius of curvature of the lens surface on the object side of the positive lens.

12. The zoom lens according to claim 1, wherein image plane movement of an object image is corrected by moving at least part of the second lens unit in a direction having a component in a direction orthogonal to an optical axis.

13. The zoom lens according to claim 1, wherein each of the lens surface on the object side of the negative lens and the lens surface on the image side of the negative lens is convex, and
wherein the positive lens is a positive meniscus lens.

14. An image pickup apparatus comprising:
a zoom lens; and
an image sensor configured to receive an image formed by the zoom lens,
wherein the zoom lens includes, in order from an object side to an image side, a first lens unit having negative refractive power and a second lens unit having positive refractive power,
wherein a distance between adjacent lens units changes during zooming,
wherein the first lens unit includes a plurality of lenses, the plurality of lenses consisting of a negative lens having a concave lens surface on the image side, and a positive lens having a convex lens surface on the object side and disposed on the image side of the negative lens via an air gap, and,
wherein the following inequalities are satisfied:

$$-7.00 < f12/f11 < -3.70$$

$$0.40 (R1f+R2r)/(R1f-R2r) < 1.00$$

where f11 is a focal length of the negative lens, f12 is a focal length of the positive lens, R1f is a radius of curvature of a lens surface on the object side of the negative lens, and R2r is a radius of curvature of a lens surface on the image side of the positive lens.

15. The image pickup apparatus according to claim 14, wherein an effective image circle diameter at a wide-angle end is smaller than that at a telephoto end.

16. An imaging system comprising:
a zoom lens; and
a control unit configured to control the zoom lens during zooming,
wherein the zoom lens includes, in order from an object side to an image side, a first lens unit having negative refractive power and a second lens unit having positive refractive power,
wherein a distance between adjacent lens units changes during zooming,
wherein the first lens unit includes a plurality of lenses, the plurality of lenses consisting of a negative lens having a concave lens surface on the image side, and a positive lens having a convex lens surface on the object side and disposed on the image side of the negative lens via an air gap, and,
wherein the following inequalities are satisfied:

$$-7.00 < f12/f11 < -3.70$$

$$0.40 < (R1f + R2r)/(R1f - R2r) < 1.00$$

where f11 is a focal length of the negative lens, f12 is a focal length of the positive lens, R1f is a radius of curvature of a lens surface on the object side of the negative lens, and R2r is a radius of curvature of a lens surface on the image side of the positive lens.

17. The imaging system according to claim 16, wherein the control unit is provided separately from the zoom lens, and includes a transmitter configured to transmit a control signal for controlling the zoom lens.

18. The imaging system according to claim 16, wherein the control unit is provided separately from the zoom lens, and includes an operation unit configured to operate the zoom lens.

19. The imaging system according to claim 16, further comprising a display unit configured to display information about zoom of the zoom lens.

* * * * *